United States Patent
Palanisamy et al.

(10) Patent No.: US 11,083,033 B2
(45) Date of Patent: *Aug. 3, 2021

(54) SMALL DATA USAGE ENABLEMENT IN 3GPP NETWORKS

(71) Applicant: Convida Wireless LLC, Wilmington, DE (US)

(72) Inventors: Suresh Palanisamy, Tamilnadu State (IN); Michael F. Starsinic, Newtown, PA (US); Paul L. Russell, Jr., Pennington, NJ (US)

(73) Assignee: Convida Wireless, LLC, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/527,587

(22) Filed: Jul. 31, 2019

(65) Prior Publication Data

US 2019/0357288 A1 Nov. 21, 2019

Related U.S. Application Data

(63) Continuation of application No. 15/568,236, filed as application No. PCT/US2016/028905 on Apr. 22, 2016, now Pat. No. 10,412,775.

(Continued)

(51) Int. Cl.
*H04W 76/15* (2018.01)
*H04W 8/18* (2009.01)
(Continued)

(52) U.S. Cl.
CPC ............. *H04W 76/15* (2018.02); *H04W 4/70* (2018.02); *H04W 8/04* (2013.01); *H04W 8/08* (2013.01); *H04W 8/18* (2013.01); *H04W 76/12* (2018.02)

(58) Field of Classification Search
CPC ......... H04W 76/15; H04W 4/70; H04W 8/04; H04W 8/08; H04W 8/18; H04W 76/12
See application file for complete search history.

(56) References Cited

U.S. PATENT DOCUMENTS

2012/0208545 A1 8/2012 Yang et al.
2012/0281566 A1* 11/2012 Pelletier ................ H04W 76/27
370/252

(Continued)

FOREIGN PATENT DOCUMENTS

EP 2509345 A1 10/2012
EP 2568761 A1 3/2013
(Continued)

OTHER PUBLICATIONS

Huawei et al: "Clarification of IP via NAS solution", 3GPP Draft; S2-133009, Jul. 19, 2013, 11 pages.
(Continued)

*Primary Examiner* — Chi Ho A Lee
(74) *Attorney, Agent, or Firm* — BakerHostetler

(57) ABSTRACT

The standards organization 3GPP is exploring new small data delivery techniques for machine-type communications (MTC). It is recognized herein that existing approaches leave the "small data" decision to the service capability server (SCS) for downlink data and to the user equipment (UE) for uplink data. A user equipment (UE) or the core network can identify the services (or flows) that should be characterized as Small Data, and can make decisions as to when to employ optimized Small Data procedures.

20 Claims, 22 Drawing Sheets

Related U.S. Application Data

(60) Provisional application No. 62/151,088, filed on Apr. 22, 2015.

(51) Int. Cl.
 *H04W 4/70*  (2018.01)
 *H04W 76/12* (2018.01)
 *H04W 8/04*  (2009.01)
 *H04W 8/08*  (2009.01)

(56) References Cited

U.S. PATENT DOCUMENTS

| | | | |
|---|---|---|---|
| 2013/0080597 A1 | 3/2013 | Liao | |
| 2013/0083465 A1 | 4/2013 | Motoishi et al. | |
| 2013/0100895 A1* | 4/2013 | Aghili | H04W 4/00 370/329 |
| 2013/0265975 A1 | 10/2013 | Shirani-Mehr et al. | |
| 2013/0336218 A1 | 12/2013 | Gupta | |
| 2014/0016614 A1 | 1/2014 | Velev et al. | |
| 2014/0177534 A1 | 6/2014 | McHardy et al. | |
| 2014/0242970 A1* | 8/2014 | Yu | H04W 8/24 455/419 |
| 2014/0301288 A1* | 10/2014 | Koc | H04L 5/0094 370/329 |
| 2015/0092554 A1 | 4/2015 | Mochizuki et al. | |
| 2015/0119058 A1* | 4/2015 | Rune | H04W 52/0219 455/452.1 |
| 2015/0172847 A1 | 6/2015 | Yang et al. | |
| 2015/0223284 A1* | 8/2015 | Jain | H04W 72/0486 370/329 |
| 2016/0007213 A1 | 1/2016 | Cui et al. | |
| 2016/0014037 A1 | 1/2016 | Hu et al. | |
| 2016/0050602 A1 | 2/2016 | Cui et al. | |
| 2016/0242208 A1* | 8/2016 | Haneji | H04W 74/002 |
| 2017/0041968 A1* | 2/2017 | Jin | H04W 76/10 |
| 2017/0048112 A1 | 2/2017 | Ronneke et al. | |
| 2017/0127277 A1 | 5/2017 | Yu | |
| 2017/0187691 A1* | 6/2017 | Lee | H04L 41/08 |
| 2018/0376531 A1* | 12/2018 | Martinez Tarradell | H04W 74/0833 |
| 2019/0037441 A1* | 1/2019 | Liu | H04W 4/70 |

FOREIGN PATENT DOCUMENTS

| | | |
|---|---|---|
| EP | 2768251 A1 | 8/2014 |
| GB | 2513896 A | 11/2014 |
| JP | 2014-523181 A | 9/2014 |
| JP | 2016-507942 A | 3/2016 |

OTHER PUBLICATIONS

One M2M Technical Specification, OneM2M-TS-0001 "Functional Architecture" V-0.0.7, Aug. 26, 2013, 43 pages.
ZTE, 3GPP TSG SA WG2 #92, S2-122847, Transmission of Small IP Packets, Mar. 7, 2012.

* cited by examiner

DATA FLOW SETTINGS

ENABLE DATA OVER CONTROL PLANE — ON/OFF

CONTROL PLANE DATA PACKET LIMIT — NUMBER BYTES

CONTROL PLANE DATA PACKET MAX FREQUENCY — NUMBER PER SECOND

| 8 | 7 | 6 | 5 | 4 | 3 | 2 | 1 | |
|---|---|---|---|---|---|---|---|---|
| colspan=8 | Traffic flow template IEI | | | | | | | Octet 1 |
| colspan=8 | Length of traffic flow template IE | | | | | | | Octet 2 |
| colspan=3 | TFT operation code | | | E bit | colspan=4 | Number of packet filters | | | Octet 3 |
| colspan=8 | Packet filter list | | | | | | | Octet 4 / Octet z |
| colspan=8 | Parameters list | | | | | | | Octet z+1 / Octet v |

Fig. 16

| 8 | 7 | 6 | 5 | 4 | 3 | 2 | 1 | |
|---|---|---|---|---|---|---|---|---|
| 0 | 0 Spare | colspan=2 | Packet filter direction 1 | colspan=4 | Packet filter identifier 1 | | | Octet 4 |
| colspan=8 | Packet filter evaluation precedence 1 | | | | | | | Octet 5 |
| colspan=8 | Length of Packet filter contents 1 | | | | | | | Octet 6 |
| colspan=8 | Packet filter contents 1 | | | | | | | Octet 7 / Octet m |
| 0 | 0 Spare | colspan=2 | Packet filter direction 2 | colspan=4 | Packet filter identifier 2 | | | Octet m+1 |
| colspan=8 | Packet filter evaluation precedence 2 | | | | | | | Octet m+2 |
| colspan=8 | Length of Packet filter contents 2 | | | | | | | Octet m+3 |
| colspan=8 | Packet filter contents 2 | | | | | | | Octet m+4 / Octet n |
| colspan=8 | ... | | | | | | | Octet n+1 / Octet y |
| 0 | 0 Spare | colspan=2 | Packet filter direction N | colspan=4 | Packet filter identifier N | | | Octet y+1 |
| colspan=8 | Packet filter evaluation precedence N | | | | | | | Octet y+2 |
| colspan=8 | Length of Packet filter contents N | | | | | | | Octet y+3 |
| colspan=8 | Packet filter contents N | | | | | | | Octet y+4 / Octet z |

Fig. 17

| 8 | 7 | 6 | 5 | 4 | 3 | 2 | 1 | |
|---|---|---|---|---|---|---|---|---|
| UE network capability IEI | | | | | | | | octet 1 |
| Length of UE network capability contents | | | | | | | | octet 2 |
| EEA0 | 128-EEA1 | 128-EEA2 | 128-EEA3 | EEA4 | EEA5 | EEA6 | EEA7 | octet 3 |
| EIA0 | 128-EIA1 | 128-EIA2 | 128-EIA3 | EIA4 | EIA5 | EIA6 | EIA7 | octet 4 |
| UEA0 | UEA1 | UEA2 | UEA3 | UEA4 | UEA5 | UEA6 | UEA7 | octet 5* |
| UCS2 | UIA1 | UIA2 | UIA3 | UIA4 | UIA5 | UIA6 | UIA7 | octet 6* |
| 0 spare | SD | H.245-ASH | ACC-CSFB | LPP | LCS | 1xSRVCC | NF | octet 7* |
| 0 | 0 | 0 | 0 | 0 | 0 | 0 | 0 | octet 8*-15* |
| | | | | Spare | | | | |

Fig. 18

| 8 | 7 | 6 | 5 | 4 | 3 | 2 | 1 | |
|---|---|---|---|---|---|---|---|---|
| Small Data Indication IEI | | | | 0 Spare | 0 Spare | 0 Spare | SDIV | octet 1 |

Fig. 19

| 8 | 7 | 6 | 5 | 4 | 3 | 2 | 1 | |
|---|---|---|---|---|---|---|---|---|
| Packet filter Type 1 | | Packet filter direction 1 | | Packet filter identifier 1 | | | | Octet 4 |
| Packet filter evaluation precedence 1 | | | | | | | | Octet 5 |
| Length of Packet filter contents 1 | | | | | | | | Octet 6 |
| Packet filter contents 1 | | | | | | | | Octet 7 Octet m |
| Packet filter Type 2 | | Packet filter direction 2 | | Packet filter identifier 2 | | | | Octet m+1 |
| Packet filter evaluation precedence 2 | | | | | | | | Octet m+2 |
| Length of Packet filter contents 2 | | | | | | | | Octet m+3 |
| Packet filter contents 2 | | | | | | | | Octet m+4 Octet n |
| ... | | | | | | | | Octet n+1 Octet y |
| Packet filter Type N | | Packet filter direction N | | Packet filter identifier N | | | | Octet y+1 |
| Packet filter evaluation precedence N | | | | | | | | Octet y+2 |
| Length of Packet filter contents N | | | | | | | | Octet y+3 |
| Packet filter contents N | | | | | | | | Octet y+4 Octet z |

Fig. 20

SMALL DATA USAGE ENABLEMENT IN 3GPP NETWORKS

CROSS REFERENCE TO RELATED APPLICATIONS

This application is a continuation of U.S. patent application Ser. No. 15/568,236 filed Oct. 20, 2017 which is a National Stage Entry of international PCT/US2016/028905 filed Apr. 22, 2016 which claims the benefit of U.S. Provisional Patent Application No. 62/151,088, filed Apr. 22, 2015, the disclosures of which are hereby incorporated by reference as if set forth in their entirety.

BACKGROUND

Machine-type communication (MTC) applications often send or receive small quantities of data, which can be referred to generally as small data. In some cases, if "small data" applications engage in communication sessions that are infrequent, resources within a communication network, for instance a 3GPP system, are used inefficiently.

If an MTC application on a given user equipment (UE) needs to obtain services from a 3GPP network, it must first "attach" to the network. An attach procedure may be performed by a UE after it is powered on. FIG. 1A depicts an example attach procedure that is performed in a 3GPP network 200. At a high level, the attach procedure informs the network about the presence of the UE, and the attach procedure establishes a default bearer within the network to allow traffic to flow to or from the UE. Referring to FIG. 1A, in accordance with the illustrated example, at 201, a UE 202 issues an Attach Request that includes various parameters such as: the identity of the UE 202; the type of connection requested (e.g., Packet Data Network (PDN) Type); and optionally an Access Point Name (APN), which is a character string that refers to the packet data network to which the UE 202 is requesting access. At 203, this information is forwarded from a 3GPP base station 204 to a Mobility Management Entity (MME) 206. The MME 206 uses the APN information to select the packet data network with which to make a connection, and then uses the PDN Type to determine the type of connection (e.g., IPv4 and/or IPv6). The MME 206 may verify that the UE 202 has access to the PDN by querying (at 205a) the device's subscription profile contained in a Home Subscriber Server (HSS) 208. If the UE 202 does not provide an APN, for example, the MME 206 may use a default APN that is defined as part of the UE's subscription profile. The exchange between the MME and HSS (at 205a and 205b) may be an Update Location Request/Answer or Insert Subscriber Data Request/Answer exchange. Either way, the MME 206 may determine the PDS and the PDN gateway (PDN-GW). As shown, at 207, the MME may then setup the bearers in the 3GPP network 200. At 209, the MME 206 may issue an Attach Accept message to the UE 202 via the base station 204. At 211, the UE 202 may then terminate the attach procedure with an Attach Complete message, which may be sent to the MME 206 via the base station 204.

After attachment, for instance after the attachment procedure shown in FIG. 1A is performed, when applications on a given user equipment (UE) are not communicating, the radio bearers are released, and the UE may move to an IDLE state. As used herein, unless otherwise specified, a UE that is in an IDLE state or mode refers to a UE that is in an evolved packet core (EPC) mobility management (EMM)-REGISTERED state and an evolved packet system (EPS) connection management (ECM)-IDLE state. By way of further example, if a given application wants to establish a connection with the UE that is idle, then the UE would have to transition to a CONNECTED mode by establishing the data bearers and the signaling connection with the network. As used herein, unless otherwise specified, a UE that is in a CONNECTED mode refers to a UE that is in an ECM-CONNECTED state.

For UEs that send or receive only small amounts of data, the above-described transition may cause inefficiencies, for example, because the relative signaling overhead to perform the small data transfer is large. This resource issue is not restricted to MTC applications, and may be applicable to any application that performs small data communication. To address this issue and to support transmissions of small data with minimal network impact, which may refer to signaling overhead, the use of network resources, and a delay for reallocation for example, solutions have been proposed in 3GPP TR 23.887, "Machine-Type and other Mobile Data Applications Communications Enhancements." The solutions described in 3GPP TR 23.887 for Small Data and Device Triggering Enhancements (SDDTE) can be broadly categorized into two categories: 1) using the radio access network (RAN) control plane for small data (SD); and 2) using the data plane for SD.

In example methods that use the RAN control plane for small data, the data is transferred over a Signaling Radio Bearer (SRB) between the Evolved Node B (eNB) and the User Equipment (UE) on the air interface. The eNB to Core Network (CN) transfer may use the CN control plane over S1-MME interface to a Mobility Management Entity (MME) or the CN data plane over S1-U interface to a Serving Gateway (S-GW). FIG. 1B shows the LTE bearer architecture. In this example, the small data would be carried on a radio bearer to the eNB.

In example methods that use the data plane for small data, the data is transferred over a Data Radio Bearer (DRB) between the eNB and the UE on the air interface. The eNB to CN transfer is mostly performed over the CN data plane over S1U interface to S-GW. In some cases, however, additional conditions, such as the use of a stateless gateway or restricting to a single bearer for example, may be applied. Referring to FIG. 1B, in this example as implemented in the LTE bearer architecture, the small data would be carried on an E-RAB to the S-GW or on an EPS bearer to the P-GW.

Generally, it is recognized herein that a given UE that is in an idle mode (EMM-REGISTERED and ECM-IDLE state) would have to transition to a connected mode (ECM-CONNECTED) if the UE needs to perform a signaling procedure (e.g., TAU or Detach) or if the UE has uplink data to transmit. When the UE wants to move to the ECM-CONNECTED state to transmit data, the UE performs a Service Request procedure. The Service Request procedure synchronizes the UE and the CN on the bearer information and also establishes the corresponding data bearers. The established data bearers may then be used by the UE to transmit its data.

The case where the UE transitions from ECM-IDLE to ECM-CONNECTED to transmit data is modified in the above-mentioned solutions as described in 3GPP TR 23.887 for SDDTE. Example solutions described in 3GPP TR 23.887 require a new procedure to be used (e.g., data transfer without the service request procedure) or require modifications to the existing procedure (e.g., modifications to the service request procedure). Often the new/modified procedures are initiated from the UE.

Referring to FIG. 2, a Policy and Charging Control (PCC) architecture is shown. The PCC architecture is defined by 3GPP in TS 23.203 "Policy and charging control architecture." The PCC architecture is used to enforce policies, policy rules, QoS rules, and charging information. The interfaces shown in FIG. 2 are described in detail in section 5.2 of TS 23.203, but are summarized below for convenience. The interfaces now described below are used to provision the internet protocol (IP) flow and its corresponding rules in the 3GPP network.

With reference to FIG. 2, the AF (third party application server) uses the Rx Interface to transfer application level session information (e.g., IP filter information, bandwidth requirements, sponsor data, etc.) to the policy and charging rules function (PCRF). The PCRF forms the policy and charging control (PCC) rule based on the IP flow information, and provisions the Policy and Charging Enforcement Function (PCEF) with this PCC rule using the Gx interface. The PCRF forms the QoS rule based on the IP flow information, and provisions the Bearer Binding and Event Reporting Function (BBERF) with this QoS rule using the Gxx interface. The Sp/Ud interface allows the PCRF to request subscription information about an IP flow based on a subscriber ID. The PCRF uses the Sp interface to interact with the Subscription Profile Repository (SPR) and uses the Ud interface for the User Data Repository (UDR).

Still referring to FIG. 2, interfaces that are used to transfer charging related information are now discussed. The PCRF uses the Sd interface to signal an ADC decision to the Traffic Detection Function (TDF). The PCRF sends policy counter status information to the OCS using the Sy interface. The Gz interface enables transport of service data flow based offline charging information. The Gyn interface allows online credit control for charging in case of ADC rules-based charging in the TDF. The Gzn interface enables transport of offline charging information in case of ADC rule-based charging in the TDF.

FIG. 3 shows a 3GPP Architecture for Machine Type Communication (MTC). Machine type communication generally involves communication between different devices and/or applications without human interaction. MTC devices may utilize the services of a Service Capability Server (SCS) to communicate with external MTC applications. The 3GPP system basically provides transport for machine-to-machine (M2M) device communication. In addition, the 3GPP system may provide other value-added services for machine type communication. It is recognized herein that different architectural models are possible in a 3GPP system based on the relationship of an MTC service provider (SCS) and the 3GPP network operator. Example Architectural enhancements for MTC are defined in 3GPP TS 23.683, "Architecture enhancements to facilitate communications with packet data networks and applications." The main architecture diagram from TS 23.683 is shown in FIG. 3. A MTC-IWF (Machine Type Communication—Inter Working Function) is introduced in the 3GPP system to enable the communication of 3GPP networks with one or more service capability servers (SCSs). The MTC-IWF may be a standalone entity or a logical entity of another network element. The MTC-IWF hides the internal CN topology and relays or translates information sent over the diameter-based Tsp reference point to invoke specific functionality in the CN. Other architectural models are defined in 3GPP TS 23.708. For example, a Service Capability Exposure Function (SCEF) is introduced in the 3GPP System to enable the communication of 3GPP networks with one or more service capability servers (SCSs). The SCEF may be a standalone entity or a logical entity of another network element. The SCEF hides the internal CN topology, relays or translates information that is received via an API call, and interfaces with various core network nodes to invoke the functionality that is requested by the API call. For example, the SCEF may interface with the MTC-IWF, the HSS, the PCRF, the UDR, MME, etc.

It is recognized herein that 3GPP is exploring new small data delivery techniques for MTC communications. For example, the solutions in TR 23.887 address the issue of more efficiently carrying out Small Data transfers by reducing the signaling overhead. Existing approaches, however, lack capabilities and efficiencies.

SUMMARY

3GPP is exploring new small data delivery techniques for MTC communications. The proposed techniques involve sending data over the control plane, for example, in a non-access-stratum (NAS) or radio resource control (RRC) message. It is recognized herein that existing approaches leave the "small data" decision to the service capability server (SCS) for downlink data and to the user equipment (UE) for uplink data. Embodiments disclosed herein address how a user equipment (UE) or the core network identifies the services (or flows) that should be characterized as Small Data. Embodiments disclosed herein also address when to employ optimized Small Data procedures. Embodiments disclosed herein also disclose how an SCS or application server (AS) or application function (AF), which may be referred to interchangeably or collectively as an SCS/AS/AF, may communicate directly with core network nodes, such as the MTC-IWF, the home subscriber server (HSS), the policy and charging rules function (PCRF), the user data repository (UDR), and the mobile management entity (MME) for example. It will be appreciated that, rather than directly communicating with the core network nodes, the SCS/AS/AF may communicate with the core network nodes via a service capability exposure function (SCEF).

In an example embodiment, the core network (CN) controls small data (SD) communications. For example, an application function (AF) or service capability server (SCS) or Application Service (AS), which can be referred to collectively as an AF/SCS/AS or as any variation thereof, may provision the 3GPP network with information associated with data flows so that the 3GPP network can make decisions concerning which flows should be considered "small data". In one aspect, the AF/SCS provisions the PCRF with small data flow information via the Rx interface. In another aspect, the AF/SCS provisions the PCRF with small data flow information via the Tsp interface and MTC-IWF. In yet another aspect, the AF/SCS provisions the subscription database (HSS/UDR) with small data flow information via the Ud/Mh interface. As described herein, the small data flow information that is provided to a 3GPP network may be used by the 3GPP network. For example, the core network may route downlink data to the UE via small data delivery methods. In one example, the small data flow information is used by the 3GPP Network to configure a UE to route uplink data towards the 3GPP network using small data delivery methods. New subscription information is described herein that supports small data flows in the 3GPP network. In yet another example, additional information elements are described, and existing information elements are modified. Such information elements may be included in messages that are shared between the 3GPP network and a UE to support configuring the UE to use small data delivery in the uplink.

In another example embodiment, an apparatus, for instance an apparatus comprising an MME, may receive a first message from a UE. The first message may include an attach request that includes an indication that the UE supports small data procedures. Alternatively, or additionally, the first message may comprise an attach request that includes a request that the UE use small data procedures. The apparatus may also receive a second message from a network node, for instance an HSS. The second message may be indicative of one or more PDN connections that should use small data procedures. The second message may also be indicative of a type of small data procedure that corresponds to each of the one or more PDN connections. Based on the second message, the apparatus may respond to the first message. For example, the response may comprise an attach response message that includes an indication that the UE should behave in a small data mode that uses one of the small data procedures indicated in the second message. The apparatus may then deliver data using one of the small data procedures indicated in the second message. The apparatus may also receive data from the UE in accordance with one of the small data procedures indicated in the second message. In some cases, the small data procedure may be indicated via non-access-stratum (NAS) messaging.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to limitations that solve any or all disadvantages noted in any part of this disclosure.

BRIEF DESCRIPTION OF THE DRAWINGS

In order to facilitate a more robust understanding of the application, reference is now made to the accompanying drawings, in which like elements are referenced with like numerals. These drawings should not be construed to limit the application and are intended only to be illustrative.

FIG. 14 depicts an example graphical user interface (GUI) in accordance with an example embodiment;

FIG. 16 shows an example Traffic Flow Template (TFT) Information Element (IE).

FIG. 17 shows an example packet filter list of a TFT.

FIG. 18 shows an example of a modified UE Network Capability in accordance with an example embodiment.

FIG. 19 shows an example coding of a Small Data Indication information element.

FIG. 20 shows an example modified packet filter list.

DETAILED DESCRIPTION OF ILLUSTRATIVE EMBODIMENTS

Figure 1A:
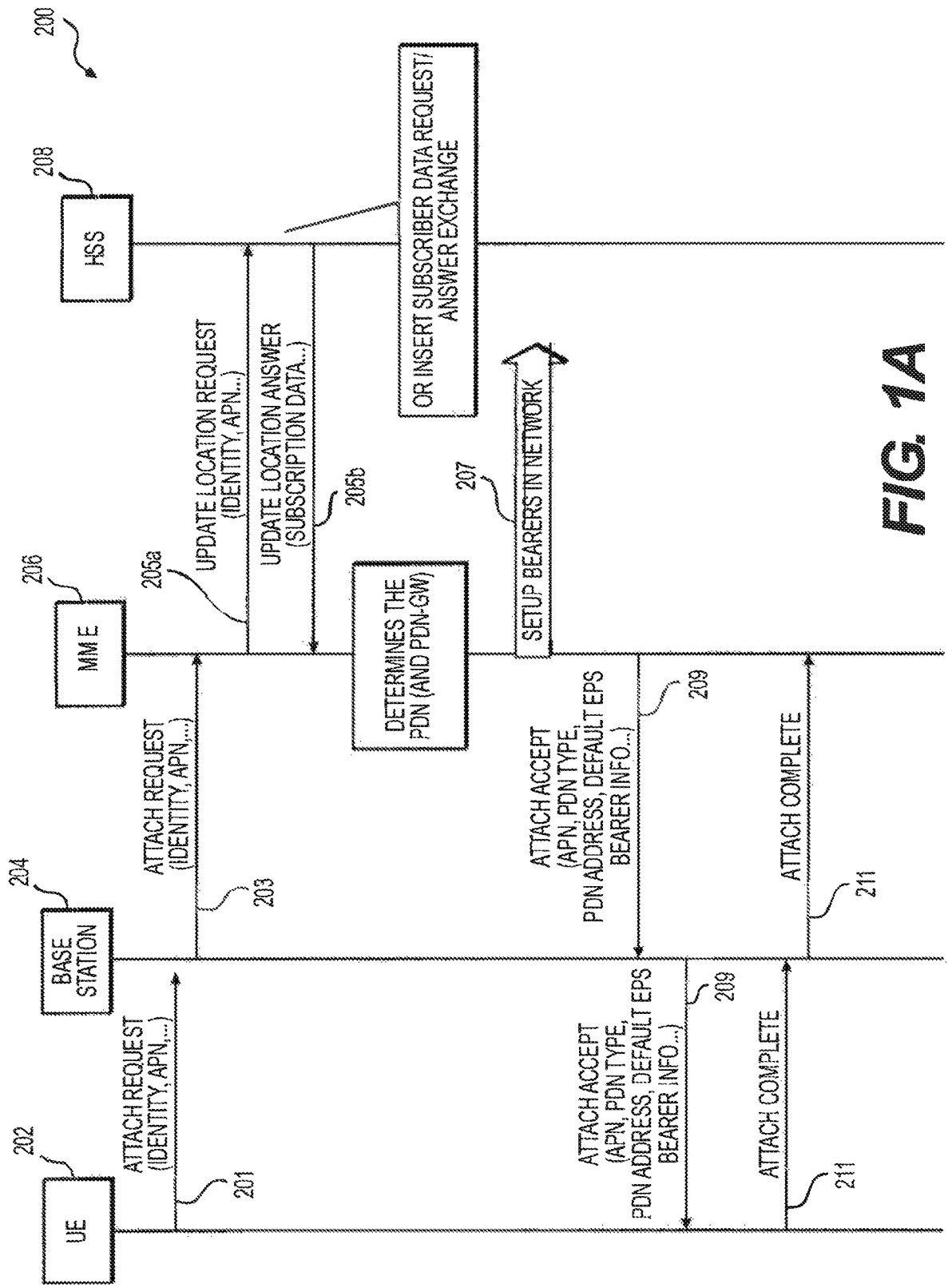
FIG. 1A is a call flow that shows an example attach procedure that can be performed in a 3GPP network.
Figure 1B:
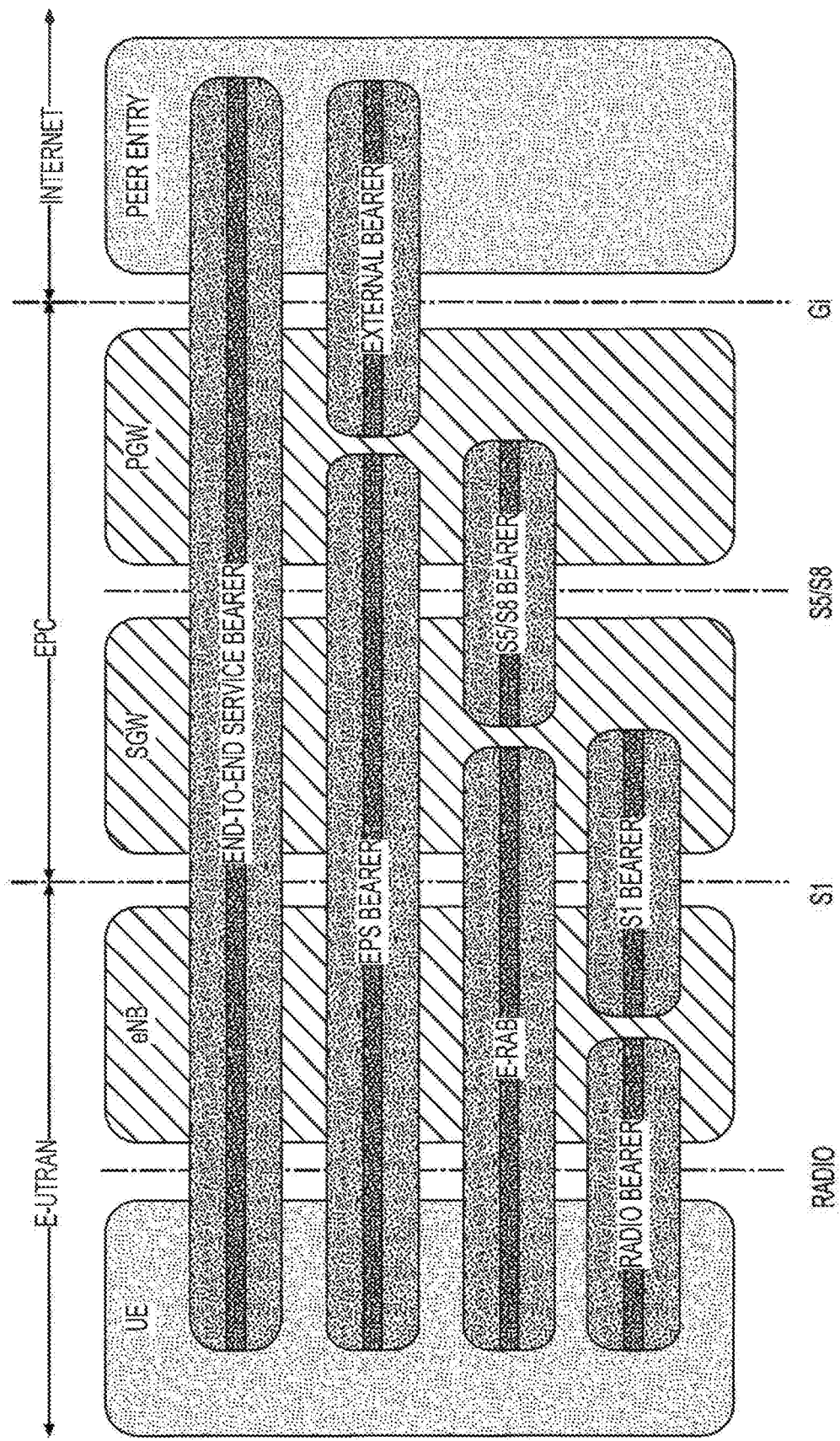
FIG. 1B is an example diagram of the LTE architecture in which the procedure shown in FIG. 1A, among others, can be performed.

As used herein, unless otherwise specified, a user equipment (UE) that is an "IDLE" mode or state refers to a UE that is in an evolved packet core (EPC) mobility management (EMM)-REGISTERED state and an evolved packet system (EPS) connection management (ECM)-IDLE state. A UE that is in "CONNECTED" mode refers to a UE that is in an ECM-CONNECTED state. As used herein, the term "small data filter" may refer to: 1) a packet filter as described in the traffic flow template (TFT) in 3GPP TS 24.008, "Mobile radio interface Layer 3 specification; Core network protocols"; 2) an IPFilterRule as described in RFC 3588, "Diameter Base Protocol"; or 3) a customized filter that can be used to match IP traffic. The terms "small data information", "data flow information", and variations thereof, are used interchangeably herein, and generally refer to information that describes one or more characteristics associated with IP traffic that qualifies as small data. For example, small data information may include small data filters. As used herein, unless otherwise specified, the term "small data plane" refers to a path on which small data may be transferred. In an example, the path may be a combination of the radio access network (RAN) control plane, RAN data plane, core network (CN) control plane, and CN data plane. In some cases, the combinations may depend on the solution chosen by 3GPP for Small Data transfer. As used herein, unless otherwise specified, the term "small data procedure" refers to an approach (e.g., messages and procedures) that are selected by 3GPP for the transfer of Small Data. As mentioned above, some approaches are described in 3GPP TR 23.887, and one or more of those approaches may be finalized.

As described above, existing approaches or techniques for managing small data that have been proposed generally involve sending data over the control plane or data plane. It is recognized herein that the approaches that have been discussed in 3GPP thus far leave the "small data decision" to the SCS for downlink data and to the UE for uplink data. In other words, it is up to the UE or SCS to use existing procedures to send data over the user plane (e.g., the IP-based SGi reference point) or to use another small data delivery method.

It is recognized herein that it may be inefficient to leave the "small data decision" to the SCS or UE. In some cases, the UE or SCS will make decisions based on what is best for the UE or SCS, rather than the 3GPP network. For example, the UE may choose to always use the fastest delivery method, even if a longer delivery time would not impact performance. At least because the 3GPP core network is aware of network conditions, for example, it is recognized herein that the 3GPP core network may be better positioned to make decisions concerning the most efficient method for delivering data.

In accordance with various embodiments, architectural enhancements are disclosed so that the 3GPP core network can take control of the "Small Data Decision." For example, in one aspect, the Services Capability Server (SCS) or the Application Server (AS), which can be collectively referred to as the SCS/AS (or variations thereof) for convenience and without limitation, can provide the 3GPP network with a characterization of data flows between the SCS/AS and its UEs. Further, as described below, based on the information that is provided by the SCS/AS, the 3GPP network can instruct the UE when to use the small data plane, and the 3GPP network can decide when to direct downlink traffic from the SCS/AS to the small data plane.

In some cases, in the uplink, a UE is required to make a decision regarding using a small data procedure or using the existing Service Request procedure for data transfer. It is recognized herein that the UE should be aware of when to initiate Small Data procedures. In an example embodiment, the CN and/or SCS are able to configure the UE so that the UE knows when to use the Small Data procedures instead of using the typical Service Request procedure. In some cases, in the downlink, the network determines which flows/bearers should be treated as small data. In an example embodiment, the network may make such determinations based on flow information that is received from the SCS.

Various inputs from the AS/SCS are now described. It is recognized herein that generally the service layer is best informed of the data rate needs of a given service. For example, the service layer is often able to anticipate if a service will always qualify as small data or if the given service will only be able to periodically classify its activity as small data (e.g., heart beat messages). By way of further example, in some cases, the service layer can be expected to know the number of packets that would be transmitted during a particular period and the size of the packets that are typically transmitted. It is recognized herein that if various information, such as the above-mentioned information for example, in the service layer can be shared with the network, the network can use the information to manage the resources of the network in an efficient manner. For example, the network can create rules that are based on the actual requirements of services in real time.

In an example embodiment, the Rx interface is enhanced to support data flow information, for instance small data flow information. For example, the AF/SCS can coordinate flow information via the Rx interface. For example, the AF may provision small data information associated with an M2M application to a PCRF using the Rx interface. In another example aspect described below, new attribute value pairs (AVPs) are added to include small data information in existing AA-Request (AAR) diameter messages of the Rx interface. Referring generally to the AF illustrated in FIG. 2, it will be understood that, as used herein, the AF may be a MTC server, an M2M server, an SCS, or the like, and thus the AF may also be referred to generally as a network node.

Referring to Table 1 of the Appendix, in accordance with an example embodiment, the AF/SCS provides small data flow information associated with each application over the Rx interface. The information can be pre-provisioned at the AF/SCS by the operator. Alternatively, or additionally, an application can learn the information by monitoring the application traffic and collecting statistical data associated with the application. Table 1 includes example information elements that can be provided to the PCRF per application. The elements in the Table 1 may be optional, and some elements may be conditional (e.g., traffic mode). As described, the PCRF can use this information to figure out whether small data rules (e.g., PCC rule, QoS rule, etc.) can be employed. It will be understood that the information elements (items) are presented by way of example, without limitation.

The example information described in Table 1 can be used to determine the nature of the traffic associated with an application. As such, the information can help in identifying infrequent Small Data transfers and frequent Small Data transfers. Generally, an application function (AF) learns about service information based on application layer signaling or from an application service provider (ASP). The AF may create a new session with the PCRF and provision the PCRF with various session details, such as, for example, QoS requirements, flow information, charging details, etc. In some cases, if the session information changes at a later point in time, then the AF sends these modifications to the PCRF. The above-described new additional session information may be sent to the PCRF, for example, during the initial session provisioning or later as a session modification request.

FIGS. 4-6, 8-11, and 13-14 (described hereinafter) illustrate various embodiments of methods and apparatus for managing small data. In these figures, various steps or operations are shown being performed by one or more clients, servers, and/or proxies. It is understood that the clients, servers, and proxies illustrated in these figures may represent logical entities in a communication network and may be implemented in the form of software (e.g., computer-executable instructions) stored in a memory of, and executing on a processor of, a node or apparatus of such network, which may comprise one of the general architectures illustrated in FIGS. 15A or 15B described below. That is, the methods illustrated in FIGS. 4-6, 8-11, and 13-14 may be implemented in the form of software (e.g., computer-executable instructions) stored in a memory of a network node or apparatus, such as for example the node or computer system illustrated in FIGS. 15C or 15D, which computer executable instructions, when executed by a processor of the node or apparatus, perform the steps illustrated in the figures. It is also understood that any transmitting and receiving steps illustrated in these figures may be performed by communication circuitry (e.g., circuitry 34 or 97 of FIGS. 15C and 15D, respectively) of the node or apparatus under control of the processor of the node or apparatus and the computer-executable instructions (e.g., software) that it executes.

Figure 4:
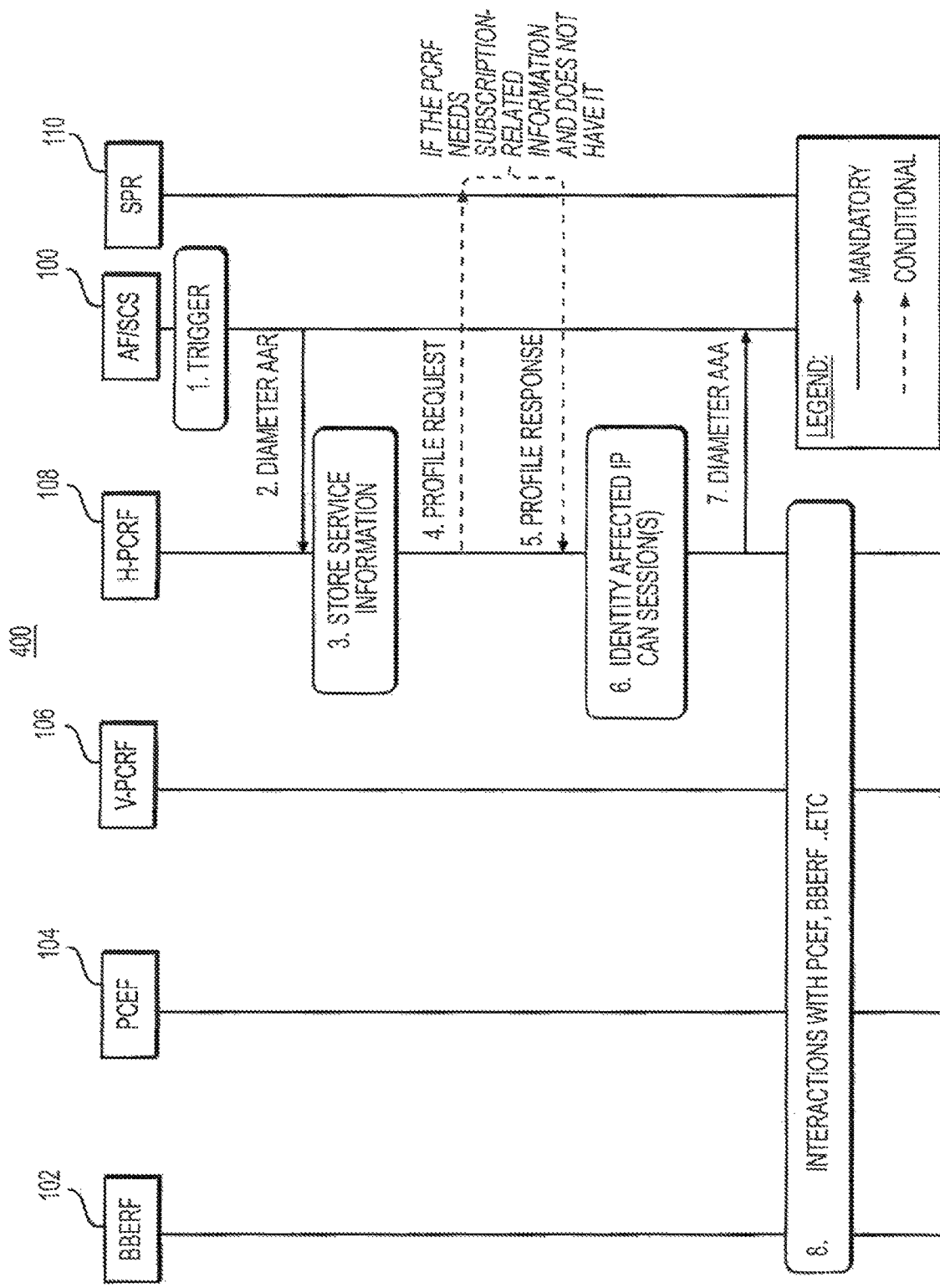
FIG. 4 is a call flow that shows an example embodiment of Application Function (AF) session establishment.

Referring now to FIG. 4, an example network 400 includes a Bearer Binding and Event Reporting Function (BBERF) 102, a Policy and Charging Enforcement Function (PCEF) 104, a Visited Policy and Charging Rules Function (V-PCRF) 106, a Home Policy and Charging Rules Function (H-PCRF) 108, an AF/SCS 100, and a Subscription Profile Repository (SPR) 110. In some cases, for convenience, the V-PCRF 106 and the H-PCRF 108 can be referred to generally as a PCRF, for instance a PCRF 101 illustrated in FIG. 5. It will be appreciated that the example network 400 is simplified to facilitate description of the disclosed subject matter and is not intended to limit the scope of this disclosure. Other devices, systems, and configurations may be used to implement the embodiments disclosed herein in addition to, or instead of, a network such as the network 400, and all such embodiments are contemplated as within the scope of the present disclosure. It will further be appreciated that reference numbers may be repeated in various figures to indicate the same or similar features in the figures.

FIG. 4 illustrates an example call flow for session establishment. In accordance with the illustrated example, the initial provisioning or modification of session information by the SCS 100 is done over the Rx interface by sending a Diameter AA-Request (AAR) message to the H-PCRF 108. 3GPP TS 29.213, "Policy and Charging Control signaling flows and Quality of Service (QoS) parameter mapping," describes messages that are illustrated in FIG. 4, but steps 2 and 7 illustrated in FIG. 4 are modified in accordance with the illustrated embodiment.

Still referring to FIG. 4, at 1, a "trigger" event causes the flow to start. Examples of an event that may cause the AS/SCS 100 to initiate this flow included, presented without limitation:

The properties of a data flow between the AS/SCS 100, or an application connected to the AS/SCS 100, and a UE need to change.

The AS/SCS 100, or an application connected to the AS/SCS 100, wishes to download a large file (e.g., a software image, a video clip, and audio clip, a new application, etc.) to a UE.

The AS/SCS 100, or an application connected to the AS/SCS 100, plans on increasing or decreasing its data rate with a UE. For example, this may happen because an application on the UE has been enabled, disabled, or moved to a new state.

The AS/SCS 100, or an application connected to the AS/SCS 100, plans on increasing or decreasing how often it communicates with a UE. For example, this may happen because an application on the UE has been enabled, disabled, or moved to a new state.

In an example, the AS/SCS 100 may set the subscription-id attribute value pair (AVP) to the external identifier of a given UE, and the PCRF 106 may query a respective Home Subscriber Server (HSS) or User Data Repository (UDR), which may be referred to collectively without limitation as a HSS/UDR, to translate the external id to an IMSI or MSISDN, for example. It will be appreciated that the term UE may refer to any node, for instance an M2M device or wireless transmit/receive unit (WTRU). In both the illustrated session establishment procedure (FIG. 4) and an example session modification procedure (not shown), the AF 100 uses the Diameter AAR message. In accordance with an example embodiment, this AAR message may include the information listed in Table 1 of the Appendix. An example updated AAR command is shown below:

Example 1 of the Appendix is an Updated AA-Request Message

In an example embodiment, a new grouped AVP is defined for the new information listed in Table 1 of the Appendix. The AVP can be included in the AAR message as a separate AVP at the command level or within the 'Media-Component-Description' AVP.

As described in 3GPP TS 29.214, "Policy and Charging Control over Rx reference point", the AF-Application-identifier AVP (AVP code 504) is of type OctetString, and it contains information that identifies a particular service to which the AF service session belongs. This information may be used by the PCRF to differentiate QoS for different application services. In an example, new values can be used for this AVP to indicate to the PCRF to use application specific default values. For example, a value of "XYZ_Electric_Measurement_App109" may be used. In accordance with the example, this value indicates to the PCRF to look for any locally configured values for this type of application. The value may be configured in the PCRF as a Small Data application along with its associated flow information details.

The 'Media-Component-Description' AVP can be modified, for example, as shown below in accordance with one example embodiment. The underlined AVPs are newly added AVPs in accordance with one example.

Example 2 of the Appendix shows an AVP format.

As shown in Example 2, the three newly defined example AVPs may be included as part of the 'Media-Sub-Component' AVP to provide details for the sub flows. The example definition above provides the bandwidth (BW) requirements of flows for a time duration. In an example, the PCRF may request for new bandwidth values after the time has expired or the AF 100 can push these details to the PCRF after the time interval expiry. Alternatively, for example, the Max-Requested-Bandwidth values and the time duration can be grouped into a new AVP and multiple instances of the new AVP may be included. The 'Traffic-Mode' AVP may indicate the current mode of the application (e.g., as heavy or light or idle, etc.) and a predetermined traffic characteristic can be assigned, for example, based on the mode and the application identifier.

Example 3 of the Appendix shows an example 'Traffic-Characteristics' AVP.

In an example embodiment, the 'Supported-Features' AVP can be modified to include an indication that the AF 100 supports one or more new features, such as those described above.

Still referring to FIG. 4, at 7, in accordance with the illustrated example, an AAA message that is sent from the PCRF to the AF 100 can be modified to inform the AF 100, if necessary for example, about flows that were considered for Small Data. In some cases in which the information provided by the AF 100, in the AAR message is not accepted by the PCRF, then the PCRF can send a rejection and also inform the AF 100 about the acceptable values for providing the Small Data service. An example updated AAA message is shown below.

Example 4 of the Appendix shows an updated AAA Message Format.

It will be understood that similar modifications can be made to the RAR and RAA messages that are used by the SCS 100 and the PCRF when flows are reauthorized or reconfigured.

Thus, as described above with reference to Table 1 and FIG. 4, a first node, for instance the SCS 100, can provision a second node based on a trigger. The second node, for instance the PCRF, can be provisioned by the first node with information associated with a data flow and an application, such that the second node can determine a rule for selecting a method that should be used to deliver information to the application or receive information from the application. A user equipment can host the application, and the UE can be configured to route uplink data in accordance with the rule. As described further below, the rule can be a Quality of Service (QoS), among others. As described with reference to FIG. 4, the first node may provision the second node by sending a diameter message directly to the second node over the Rx interface. The second node may be configured to compare the information to observed behavior associated with the data flow, and when the observed behavior differs from expected behavior, the second node may take action (e.g., terminate the data flow, inform the first node, etc.). In accordance with an example embodiment, with reference to Table 1 of the Appendix, the diameter message may include at least one of a media type associated with the application, an application identifier of the application, a bandwidth requirement of the application, a parameter associated with traffic behavior of the application, and a traffic type of the application. The parameter may indicate, for example and without limitation, a number of communications per predetermined time interval, a time delay between communications, a number of packets transmitted per communication session or per a predetermined time duration, a packet size, a time duration for which the parameter applies, or a delay tolerance. As further described above, the trigger may include an indication that a data rate associated with the application or the first node needs to change, an indication that a property of the data flow associated with the application or the first node needs to change, a notification of a data transfer event, or an indication that a frequency of communication between the application and the first node is going to change.

Figure 5:
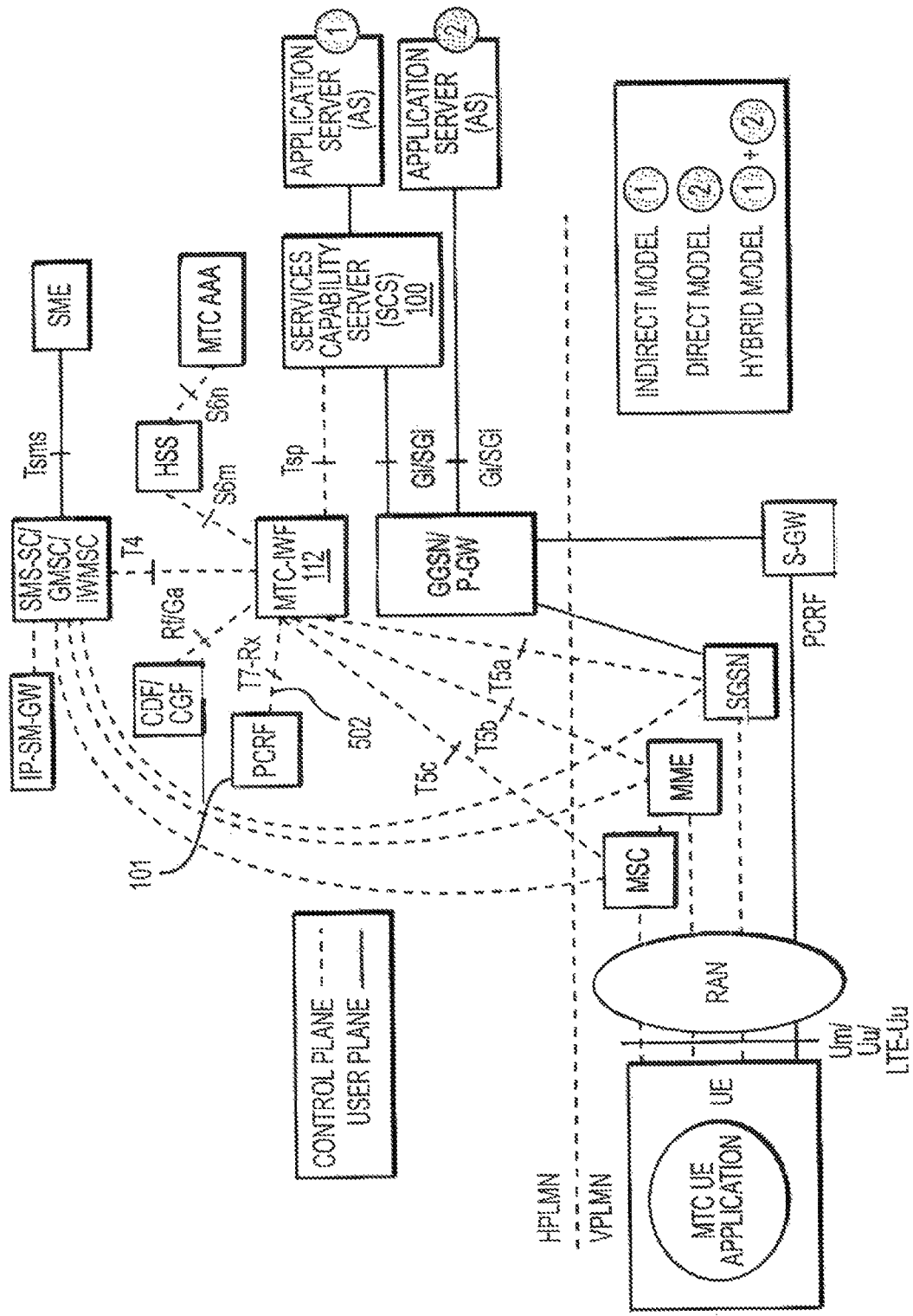
FIG. 5 depicts an additional interface, which can be referred to as a T7 interface, within the 3GPP MTC architecture shown in FIG. 3, in accordance with an example embodiment.

In accordance with an example embodiment, referring to FIG. 5, a new interface 502, which can also be referred to as "T7", is added in the MTC architecture between an MTC-IWF 112 and the PCRF 101. In one aspect, the AF provisions the PCRF 101 with small data flow information via the MTC-IWF and Tsp Interface. In another example aspect, new diameter messages called Application Flow Information Request/Answer are introduced to carry this small data flow information on the Tsp and T7 interfaces.

In some MTC scenarios, the SCS may send the service information over the Tsp interface. The messages between an AF and PCRF to establish and maintain the AF session can be reused by an SCS over the Tsp interface to the MTC-IWF. The MTC-IWF can forward this information to the appropriate PCRF. The MTC-IWF may act as a Diameter Proxy towards the PCRF or it can have a new interface (e.g., T7 or Rx') with the PCRF.

Figure 6:
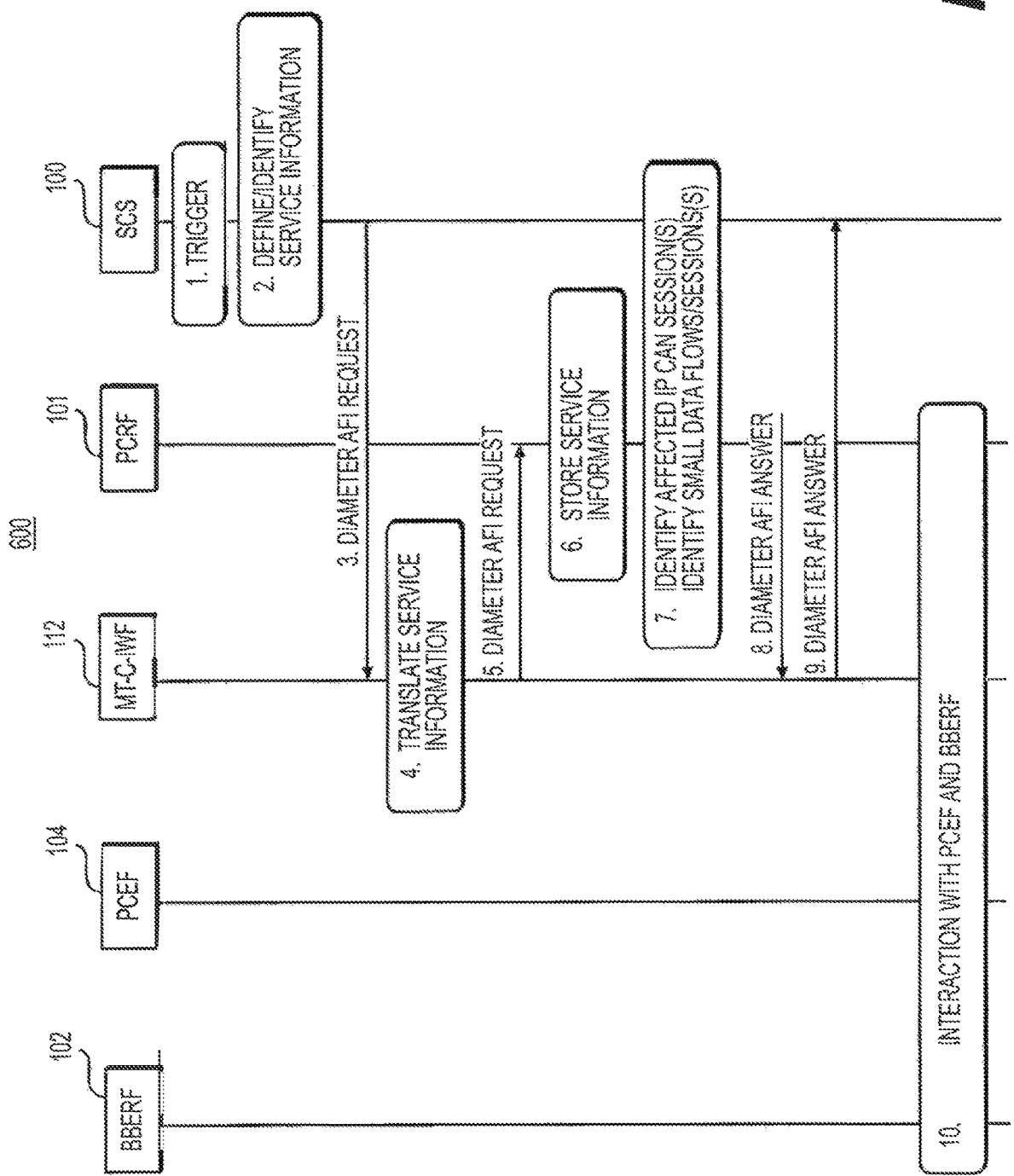
FIG. 6 is a call flow that shows Service Capability Server (SCS) information provisioning over a Tsp interface and the T7 interface depicted in FIG. 5.

Referring also to FIG. 6, an example call flow for the SCS 100 to create or modify session information with the PCRF 101 is shown. FIG. 6 shows an example network 600 that includes the BBERF 102, the PCEF 104, the MTC-IWF 112, the PCRF 101, and the SCS 100. It will be appreciated that the example network 600 is simplified to facilitate description of the disclosed subject matter and is not intended to limit the scope of this disclosure. Other devices, systems, and configurations may be used to implement the embodiments disclosed herein in addition to, or instead of, a network such as the network 600, and all such embodiments are contemplated as within the scope of the present disclosure. It will further be appreciated that reference numbers may be repeated in various figures to indicate the same or similar features in the figures.

Referring to 3 and 9 of FIG. 6, an Application Flow Information (AFI) Request/Answer Message over Tsp Interface may contain AVPs, for instance, of the kind illustrated in Example 5 of the Appendix.

Referring to steps 5 and 8 of FIG. 6, an Application Flow Information Request/Answer Message over the T7 Interface may contain the following AVPs, presented by way of example and without limitation. Note that the example AVPs on the T7 interface use the user-name AVP instead of the external-id. The MTC-IWF 112 may convert the external-id to a user-name, which is an internal operator identifier, such as IMSI for example. See Example 6 of the Appendix.

Thus, as described above with reference to FIGS. 5 and 6, a first node, for instance the SCS 100, can provision a second node based on a trigger. The second node, for instance the PCRF, can be provisioned by the first node with information associated with a data flow and an application, such that the second node can determine a rule for selecting a method that should be used to deliver information to the application or receive information from the application. The first node can provision the second node by sending a diameter message to the MTC-IWF or the Service Capability Exposure Function (SCEF). The diameter message may include at least one of a media type associated with the application, an application identifier of the application, a bandwidth requirement of the application, a parameter associated with traffic behavior of the application, and a traffic type of the application.

Figure 7:
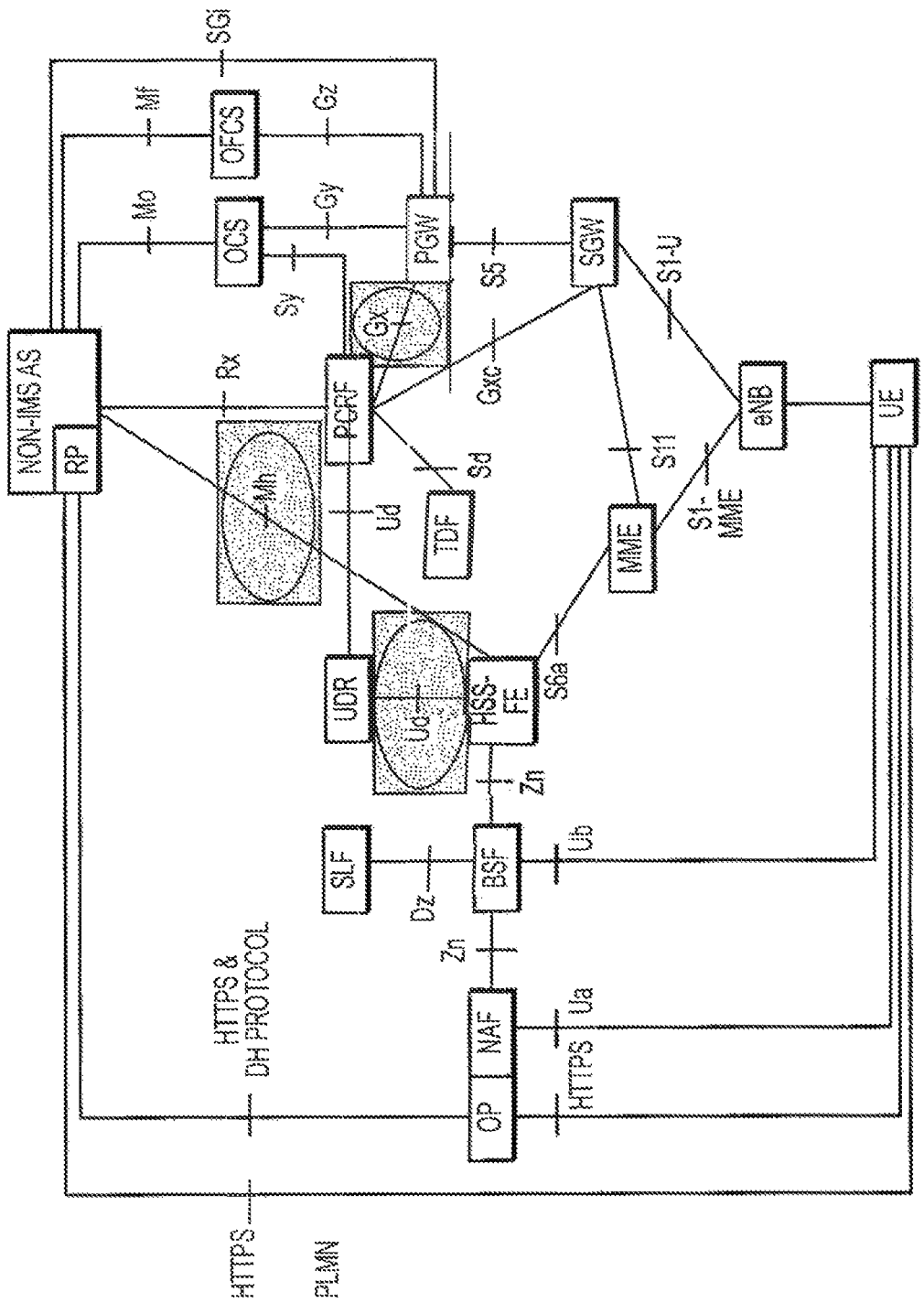
FIG. 7 is an example block diagram of the 3GPP interworking architecture.

Referring now to FIG. 7, in another example embodiment, instead of sending the small data flow information to the CN via the MTC-IWF 112, the AS/SCS 100 may store small data flow information directly in the UDR so that it can be retrieved by the PCRF, or other core network nodes, when data flows are activated or when new bearers are configured. The AS/SCS can use the same messages that are described above. FIG. 7 is reproduced from 3GPP TR 23.862, "EPC enhancements to Support Interworking with Data Application Providers (MOSAP)". The non-IMS AS illustrated in FIG. 7 may be an SCS. The Mh interface may be used by the SCS to provision small data flow information into the UDR, via the HSS-FE (HSS Front End). The PCRF may then use its Ud interface to retrieve the small data flow information from the UDR.

As described herein, small data flow information may include various traffic characteristics of the flow, such as, for example and without limitation, a number of packets, a packet size, etc. The PCRF can read this information and determine which flows should be marked for Small Data. By way of example, a purpose of having the AS/SCS provide the traffic characteristics is to allow the network e.g., (PCRF) to decide what can be considered as SD, rather than letting the AS/SCS decide Small Data and just provide the flow information (5-tuple).

In an example, the AS/SCS stores the traffic characteristics in a common user area of the UDR using the Mh interface. The UDR performs access control to check if operation is allowed. During IP-CAN session establishment, the PCRF may query the UDR for the traffic characteristics associated with the user. The PCRF can use the traffic characteristics information during the PCC rule formation. For example, downlink PCC rules can then be configured as described below, and uplink PCC rules can then be configured as described below. When the AS/SCS updates the flow information in the UDR, the PCRF may be notified of the changed data, for example, if it has subscribed to be informed of the change. The PCRF may then modify the PCC rules accordingly.

Figure 2:
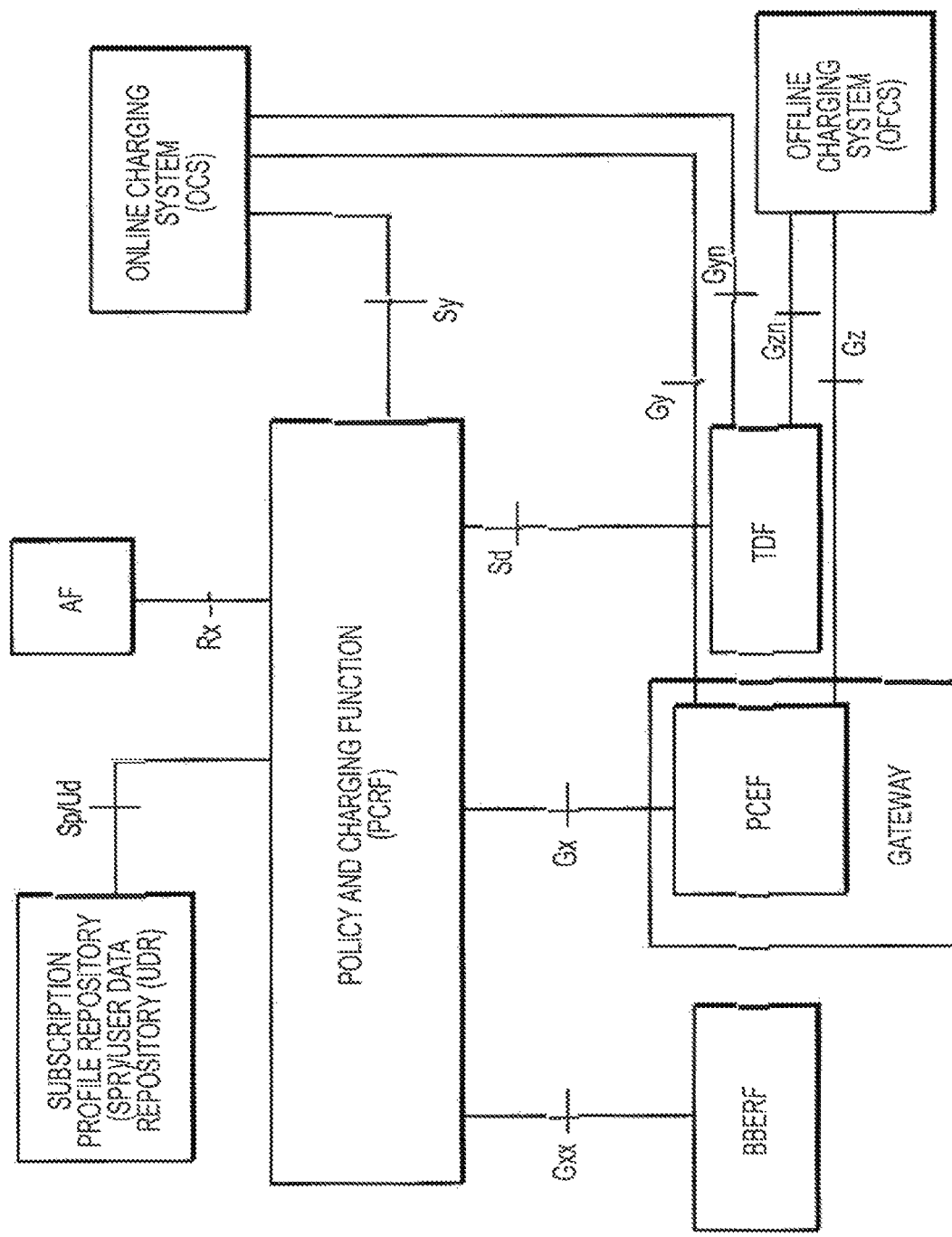
FIG. 2 is a block diagram that depicts the Policy and Charging Control (PCC) logical architecture.
Figure 3:
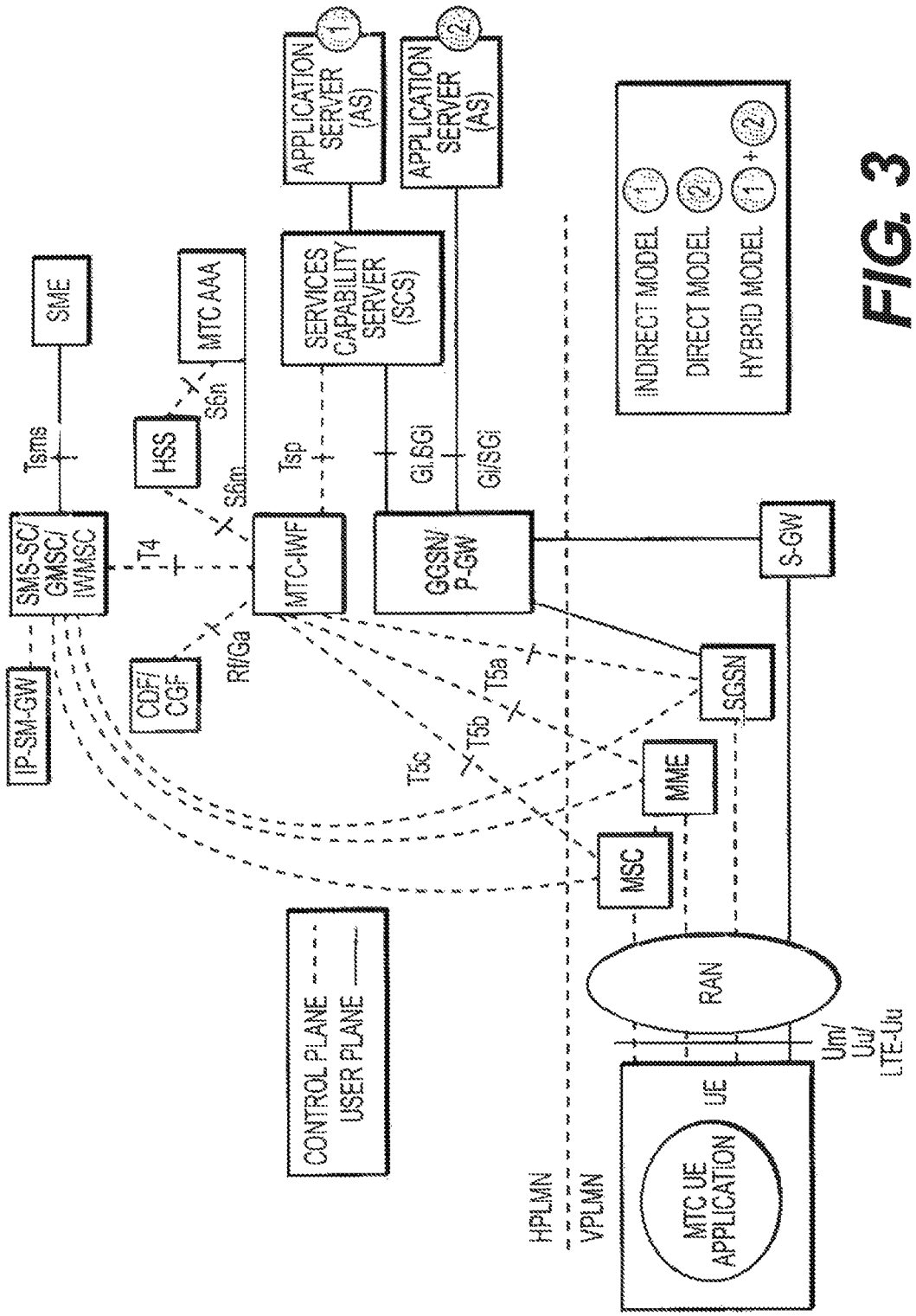
FIG. 3 is a block diagram that depicts the 3GPP architecture for Machine-Type Communication (MTC)

Small data flow information may be applied to downlink IP flows. For example, the Small Data new information that the PCRF has received from the AS/SCS may be applied in the network, in accordance with an example embodiment, when the PCRF receives the new service information from the AS/SCS, it may form a PCC/QoS rule and use existing procedures to send it to the PCEF/BBERF. In the PCC/QoS rules, the PCRF may include new information to indicate the flows/services that are to be considered as Small Data. This can be done by modifying the 'service data flow filter(s)' information within the PCC rules that the PCRF sends to the PCEF, or the QoS rules that the PCRF sends to BBERF. In one aspect, the PCC rules are sent to the PCEF over the Gx interface and the QoS rules are sent to the BBERF over the Gxx interface. FIG. 2 shows these interfaces in the PCC architecture.

Note that network nodes such as the PCRF, PGW, PCEF, and BBREF may now proceed under the assumption that the data flows will adhere to the rules that have been provisioned. The network nodes may monitor each flow and detect if the behavior of a flow differs from what has been provisioned by the AS/SCS.

By way of example, if the behavior of an uplink flow differs from what was configured by the AS/SCS, then it may be an indication that there is a problem with the device, that the device has been compromised, or the like. In an example embodiment, the 3GPP core network node may initiate a message that causes the flow to be terminated and/or initiate a notification to be sent to the AS/SCS. The notification may include an indication of what was detected and the action that was taken by the network (e.g., termination). The message may cause the AS/SCS to terminate the device's connection. The notification may be sent via an intermediary node, such as the PCRF, MTC-IWF, or SCEF for example.

By way of another example, if the behavior of a downlink flow differs from what was configured by the AS/SCS, then it may be an indication that someone is trying to illegally access the device, access the device in an improper manner, initiate a denial of service attack, or the like. In an example embodiment, the 3GPP core network node may initiate a message that causes the flow to be terminated and/or initiate a notification to be sent to the AS/SCS. The notification may include an indication of what was detected and the action that was taken by the network (e.g., termination). The message may cause the AS/SCS to terminate the device's connection. The notification may be sent via an intermediary node such as the PCRF, MTC-IWF, or SCEF.

Figure 8:
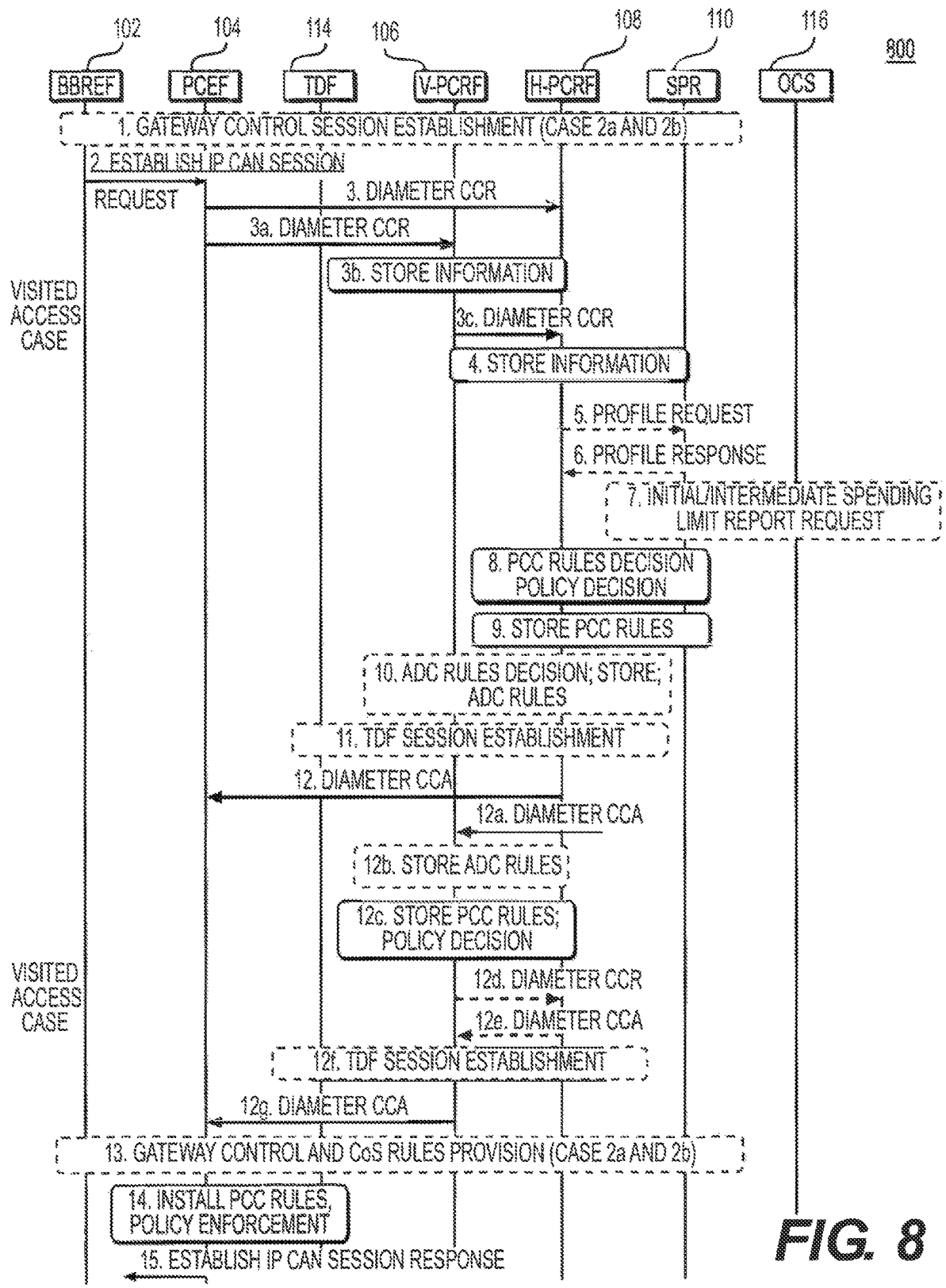
FIG. 8 is a call flow over the Gx reference point that shows an example PULL method (provisioning solicited by a Policy and Charging Enforcement Function (PCEF))
Figure 9:
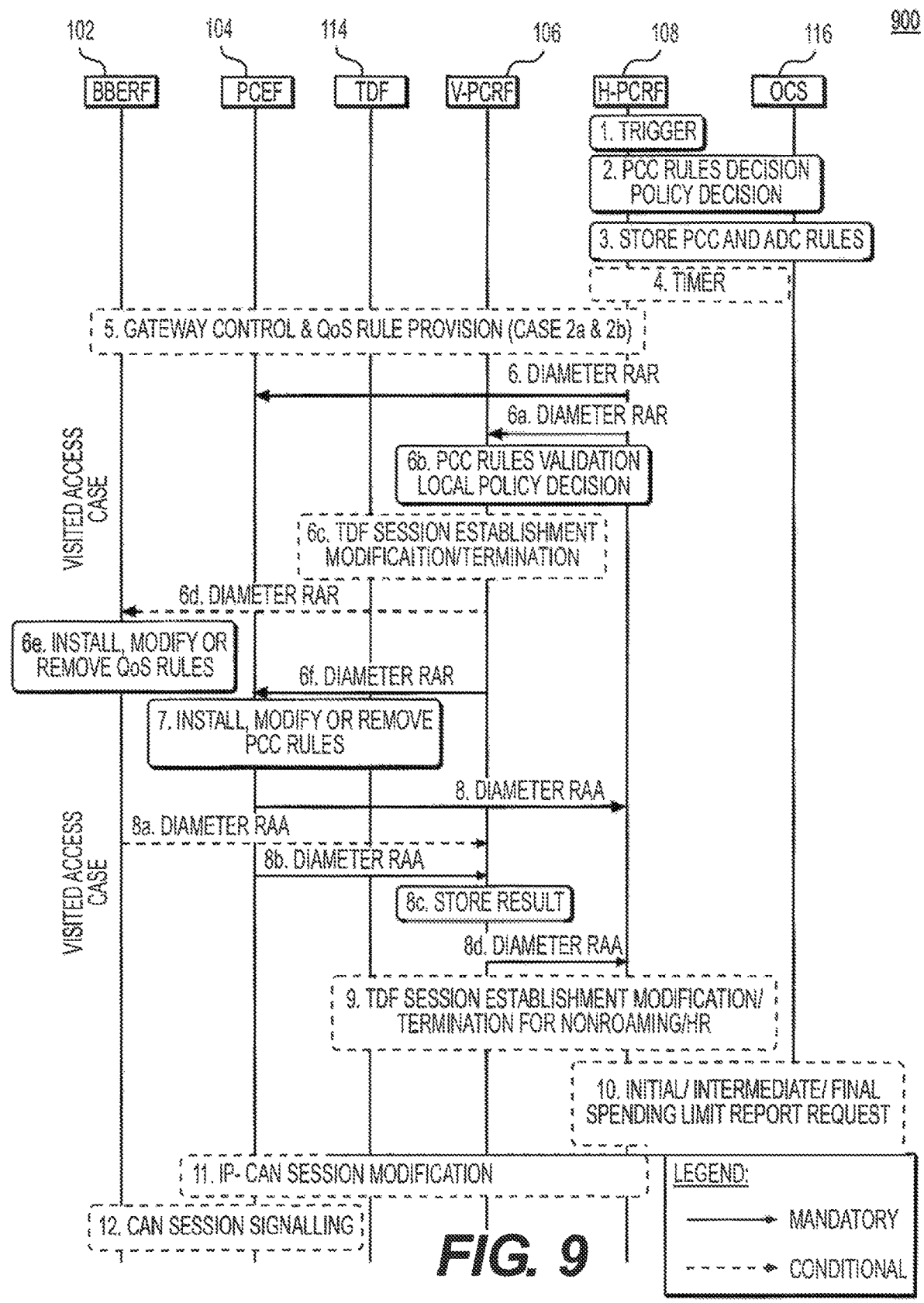
FIG. 9 is a call flow over the Gx reference point that shows an example PUSH method (unsolicited provisioning) in accordance with an embodiment.

Referring now to FIGS. 8 and 9, the Gx reference point (PCRF-PCEF), may be modified to provide the Small Data information that the PCRF has formulated to the PCEF, in accordance with an example embodiment. FIG. 8 shows an example network 800 that includes the BBERF 102, the PCEF 104, a TDF 114, the V-PCRF 106, the H-PCRF 108, an SPR 110, and an OCS 116. FIG. 9 shows an example network 900 that includes the BBERF 102, the PCEF 104, the TDF 114, the V-PCRF 106, the H-PCRF 108, and the OCS 116. It will be appreciated that the example networks 800 and 900 are simplified to facilitate description of the disclosed subject matter and is not intended to limit the scope of this disclosure. Other devices, systems, and configurations may be used to implement the embodiments disclosed herein in addition to, or instead of, a network such as the networks 800 and 900, and all such embodiments are contemplated as within the scope of the present disclosure. It will further be appreciated that reference numbers may be repeated in various figures to indicate the same or similar features in the figures.

FIGS. 8 and 9 show example procedures that may be used over the Gx interface for PCC rules provisioning. In accordance with various example embodiments, Small Data information is carried between the PCRF and the PCEF (P-GW). An example PULL procedure (Provisioning solicited by the PCEF 104) is shown in FIG. 8. Referring to FIG. 8, the PCEF 104 can use the CC-Request message to get the Small Data information from the PCRF. An example updated CC-Request message is described below in accordance with an embodiment. In the illustrated example, the CC-Answer message is used to provision PCC rules. This message can be modified to include Small Data flow filters/information. An example updated CC-Answer message is described below in accordance with an embodiment. The call flow shown in FIG. 8 is generally reproduced from 3GPP TS 29.213, although the messages at 3, 3a, 3c, 12, 12a, 12d, 12e, and 12g are modified in accordance with the illustrated embodiment.

FIG. 9 depicts an example PUSH procedure (Unsolicited provisioning) in accordance with an example embodiment. For example, during a PCRF initiated IP-CAN session modification, the PCRF can use this procedure to provision (e.g., to activate or deactivate or modify) PCC rules in the PCEF 104. The RA-Request message that is sent from the PCRF to the PCEF as part of this procedure may provision PCC rules. This message can be modified to include Small Data flow filters/information. An example updated RA-Request message is described below. The call flow shown in FIG. 9 is generally reproduced from 3GPP TS 29.213, although the messages at 6, 6a, 6d, 6f, 8, 8a, 8b, and 8d are modified in accordance with the illustrated embodiment.

Diameter messages, such as CCR, CCA, and RAR for example, may be modified in accordance with various embodiments. Further, AVP may be modified. Example AVPs that are modified in accordance with an example embodiment are underlined below. Further, the 'Supported-Features AVP can be modified to indicate the respective node's Small Data information handling capability.

Example 7 of the Appendix shows a CC-Request (CCR) command message format.

As shown in Example 7, a new AVP can be added to the 'Packet-Filter-Information' AVP, 'QoS-Information' AVP, and to the 'Routing-Filter AVP (part of 'Routing-Rule-Install' AVP) to indicate the Small Data packet filters/information.

Example 8 of the Appendix shows a CC-Answer (CCA) command message format.

As illustrated in Example 8, the 'Charging-Rule-Install' AVP and/or 'QoS-Information' AVPs can be modified to include Small Data flow filter/information, such as the information and filters that are described in Table 1 of the Appendix. Example 9 of the Appendix shows a Re-Auth-Request (RAR) command message format. As shown in Example 9, indicated above, the 'Charging-Rule-Install' AVP can be modified to include Small Data flow filter/information.

Figure 10:
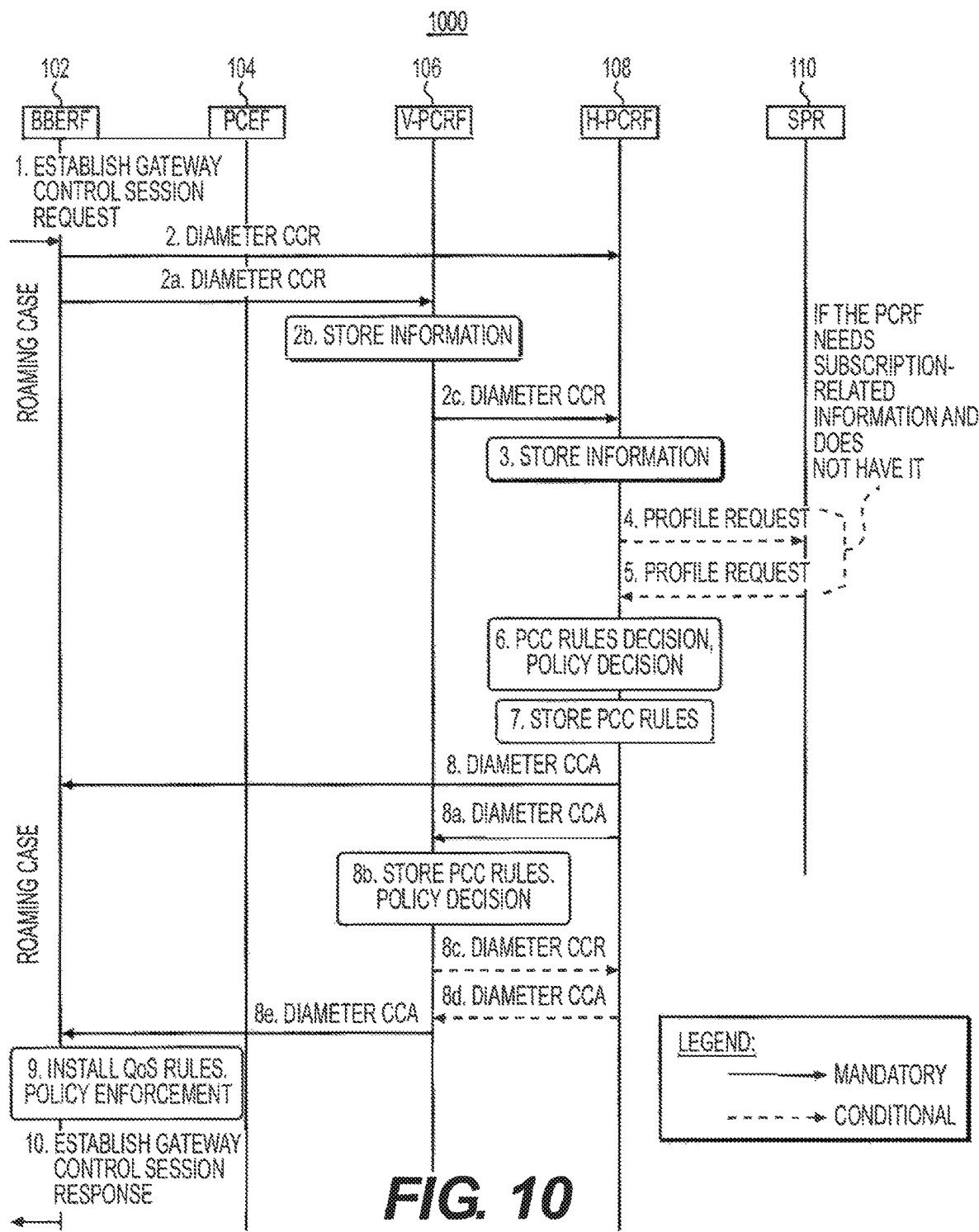
FIG. 10 is a call over the Gxx reference point that shows an example PULL method (QoS provisioning solicited by a Bearer Binding and Event Reporting Function (BBERF))
Figure 11:
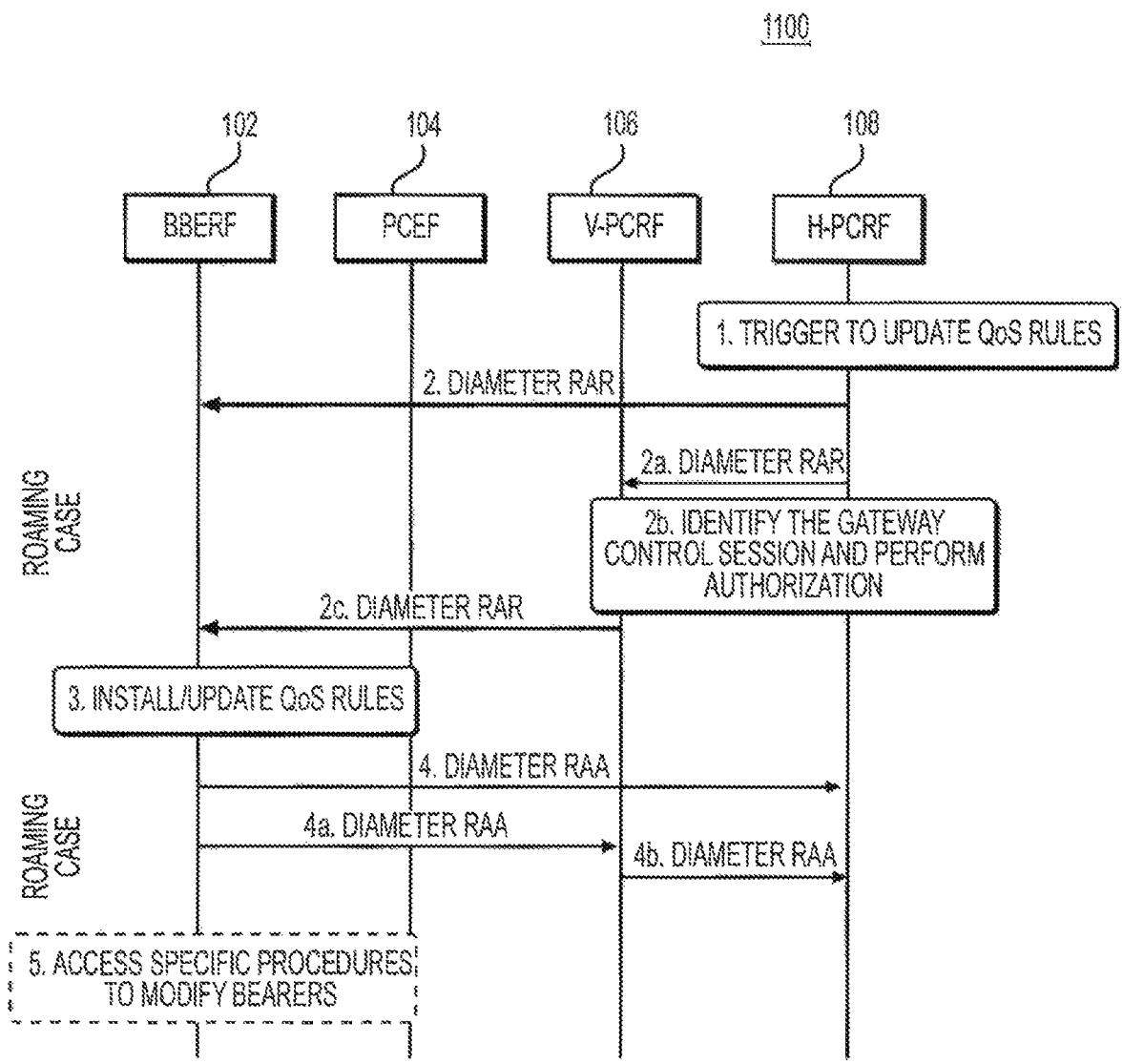
FIG. 11 is a call flow over the Gxx reference point that shows an example PUSH method (unsolicited QoS provisioning) in accordance with an example embodiment.

Referring now to FIGS. 10 and 11, the Gxx reference point (PCRF-BBREF), may be modified to provide the Small Data information that the PCRF has formulated to the BBREF, in accordance with an example embodiment. FIG. 10 shows an example network 1000 that includes the BBERF 102, the PCEF 104, the V-PCRF 106, the H-PCRF 108, and the SPR 110. FIG. 11 shows an example network 1100 that includes the BBERF 102, the PCEF 104, the V-PCRF 106, and the H-PCRF 108. It will be appreciated that the example networks 1000 and 1100 are simplified to facilitate description of the disclosed subject matter and is not intended to limit the scope of this disclosure. Other devices, systems, and configurations may be used to implement the embodiments disclosed herein in addition to, or instead of, a network such as the networks 1000 and 1100, and all such embodiments are contemplated as within the scope of the present disclosure. It will further be appreciated that reference numbers may be repeated in various figures to indicate the same or similar features in the figures.

FIGS. 10 and 11 show example procedures that may be used over the Gxx interface for QoS rules provisioning. In accordance with various example embodiments, Small Data information is carried between the PCRF and the BBERF 102. An example PULL procedure (Provisioning solicited by the BBERF 102) is shown in FIG. 10. Referring to FIG. 10, the PCEF 104 can use the above-described CC-Request message to get the Small Data information from the PCRF. In the illustrated example, the CC-Answer message is used to provision QoS rules. This message can be modified (e.g., as described above) to include Small Data flow filters/information. The call flow shown in FIG. 10 is generally reproduced from 3GPP TS 29.213, although the messages at 2, 2a, 2c, 8, 8a, 8c, 8d, and 8e are modified in accordance with the illustrated embodiment.

FIG. 11 depicts an example PUSH procedure (Unsolicited provisioning) in accordance with an example embodiment. For example, during a PCRF initiated IP-CAN session modification, the PCRF can use this procedure to provision (e.g., to activate or deactivate or modify) QoS rules in the BBERF 102. The RA-Request message that is sent from the PCRF to the BBERF 102 as part of this procedure may provision QoS rules. This message can be modified to include Small Data flow filters/information. An example updated RA-Request message is described above. The call flow shown in FIG. 11 is generally reproduced from 3GPP TS 29.213, although the messages at 2 and 2c are modified in accordance with the illustrated embodiment.

When the PCEF/BBERF receives the PCC/QoS rules as described above, it may perform Bearer binding as specified in 3GPP TS 23.203, clause 6.1.1.4. To support Small Data flows/services described herein, the bearer binding function may consider the flows that are marked for Small Data in the PCC/QoS rules and determine whether a new bearer needs to be created to support the Small Data flows, or if an existing bearer can be used. The function may also determine if the Small Data filter rules can be included as part of the default bearer TFT or the dedicated bearer TFT. In an example, the bearer binding function communicates the use of the Small Data to relevant entities (e.g., UE, S-GW, MME, etc.) within the 3GPP network.

In accordance with an example embodiment, new QCI values are used for Small Data bearers. Example QCI values are described in Table 2 of the Appendix. For example, a QCI value can be used for Small Data bearers that are delay tolerant but may require less packet loss. By way of further example, another QCI value can be used for Small data bearers that may be delay tolerant but are not tolerant of packet losses.

Applying the Small Data Flow Information to Downlink IP Flows

By way of example, designating a bearer for Small Data may cause all the data flows on the bearer to be considered as Small Data. This may not be desirable in some scenarios, for instance in scenarios involving non-MTC UE applications (e.g., chat applications). In these scenarios and for some MTC devices, the network may want only a particular IP flow, or a set of IP flows, to be considered as Small Data flows, for example, rather than marking the whole bearer. In an example embodiment, the network uses TFTs to inform the UE about which IP flows need to be considered for Small Data.

Figure 12:
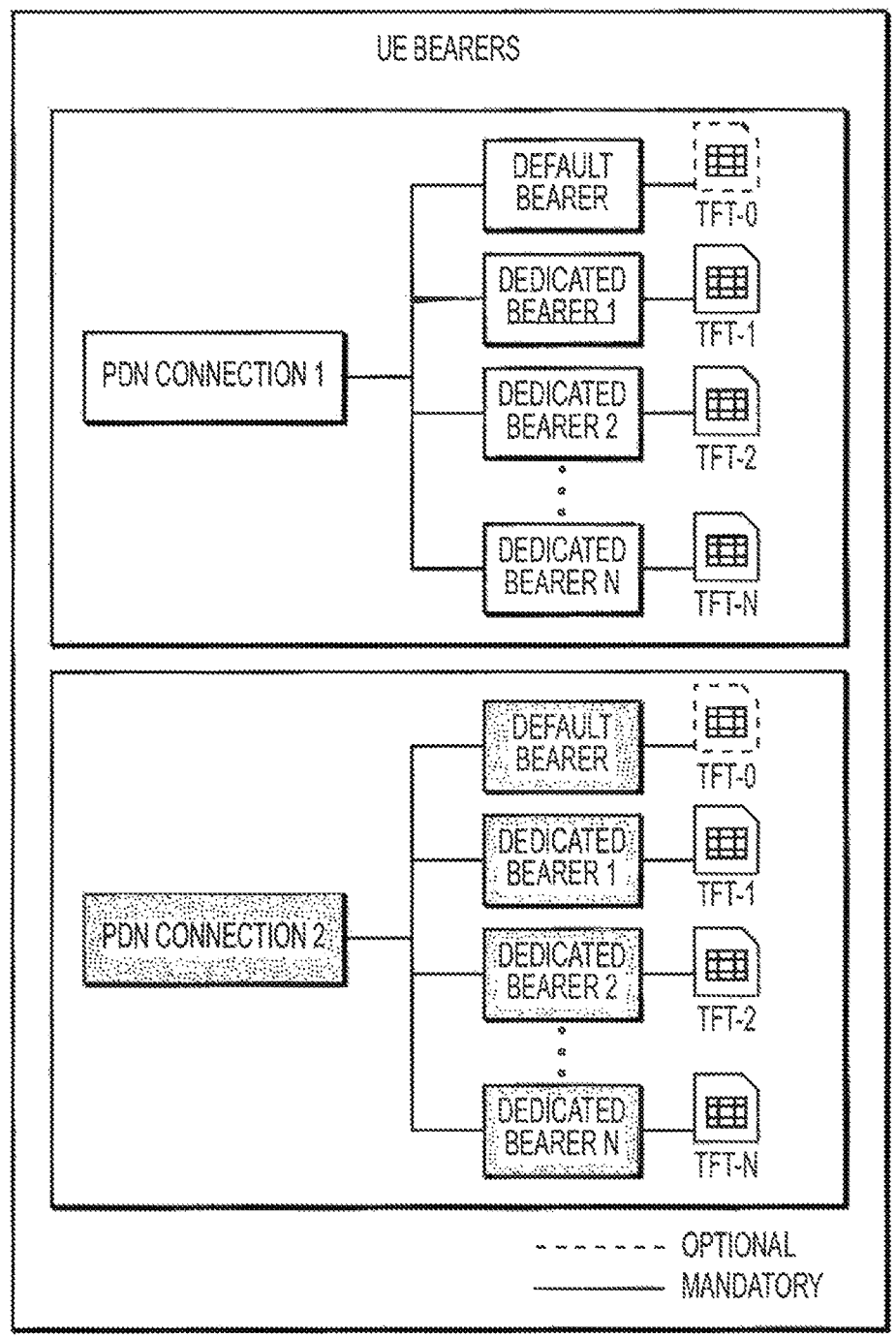
FIG. 12 depicts the current linkage of traffic flow templates (TFTs) with the bearer concept in an Evolved Packet System (EPS)

By way of background on TFTs, in a 3GPP network, the data traffic from the UE is classified and transmitted over different bearers based on the QoS requirements. The classification of the data traffic is achieved with the help of TFTs. TFTs contain packet filters that can uniquely identify an IP flow or a service (set of IP flows). One bearer can have one TFT associated with it. A default bearer may or may not have a TFT. A dedicated bearer is assigned with a TFT by the core network in the 'Activate dedicated EPS bearer context request' message and a default bearer can be assigned with a TFT in 'Modify EPS bearer context request' message. The default EPS bearer context does not have any TFT assigned during the activation procedure (e.g., in the 'Activate default EPS bearer context request' message). Modifications of the TFTs of dedicated or default bearer can be done by the core network during the bearer modification procedure in the 'Modify EPS bearer context request' message. A TFT has the set of all packet filters associated with a particular EPS bearer. A TFT may have a maximum of 16 packet filters. Each packet filter has a precedence value and this value has to be unique among all packet filters in all TFTs associated with a PDN connection. A UE evaluates all the packet filters of in all TFTs of the PDN connection in their precedence order to find the bearer on which the data has to be transmitted. FIG. 12 depicts the current linkage of TFTs with the bearer concept in EPS. FIG. 16 shows an example Traffic Flow Template (TFT) Information Element (IE), which is defined in clause 10.5.6.12 of 3GPP TS 24.008.

FIG. 17 shows an example packet filter list of a TFT. In accordance with various example embodiments, modifications are made to the TFTs summarized above. Referring to FIG. 17, each packet filter in the packet filters list shown has two spare bits. In an example embodiment, these spare bits can be used to mark a particular packet filter as a Small Data only packet filter, a normal packet filter, or both. An example modified packet filter list is shown (see FIG. 20). The TFTs for dedicated bearers and the TFTs for default bearers can contain this modified packet filter list. There are several benefits to the modifications disclosed herein.

For example, and without limitation, the packet filters marked as 'Small Data Only' can be considered as belonging to the PDN connection, rather than being tied to a particular bearer, because these packet filters will not be evaluated during regular packet classification in connected mode. By way of further example, the packet filters marked as 'Small Data Only' will have low precedence than the packet filters that are marked as 'Normal' or 'Both'. A common reserved value that indicates lowest precedence can be used for the filters that are marked as 'Small Data Only'. By assigning low precedence for 'Small Data Only' flows when in IDLE mode, if the packet filters are matched for an uplink packet then the match for a bearer that is marked for small data is identified before a match for IP flow marked for Small Data is found. In connected mode, for example, the 'Small Data Only' packet filters may not be evaluated, and thus their precedence value might not have any significance.

In an example embodiment, the packet filters that are marked as 'Small Data Only' or as 'Both' shall be evaluated by the UE during IDLE mode to CONNECTED mode transition. In some cases, when a given UE has uplink data to send, and when the UE is in IDLE mode, then the UE may first determine the PDN connection to which the uplink data needs to be sent. This may be determined by the UE based on the source IP address of the uplink data. After the PDN connection is determined, for example, then the UE may check if the uplink data that it has matches any of the packet filters that are marked as 'Small Data Only' or 'Both' in the TFTs belonging to this PDN connection. If there is a match, in accordance with an example embodiment, the UE performs the Small Data transfer procedures instead of the regular service request procedure.

In an example, the packet filters that are marked as 'Small Data Only' are not evaluated by the UE during regular traffic flow classification for the purpose of identifying a bearer to transmit the data when the UE is already in connected mode. In this example case, the packet filters that are marked as 'Normal' or 'Both' are evaluated by the UE. The modified packets filters for Small Data can be communicated to the UE by the core network in bearer modification procedures or dedicated bearer activation procedure. In accordance with an example embodiment, the Activate dedicated EPS bearer context request ESM message and the Modify EPS bearer context request EMS message are modified to carry the updated TFT IE, as further described below. In an example embodiment, the TFT concept and the procedure for creating or modifying a TFT in the UE remains the same although the ESM messages are modified.

Figure 13:
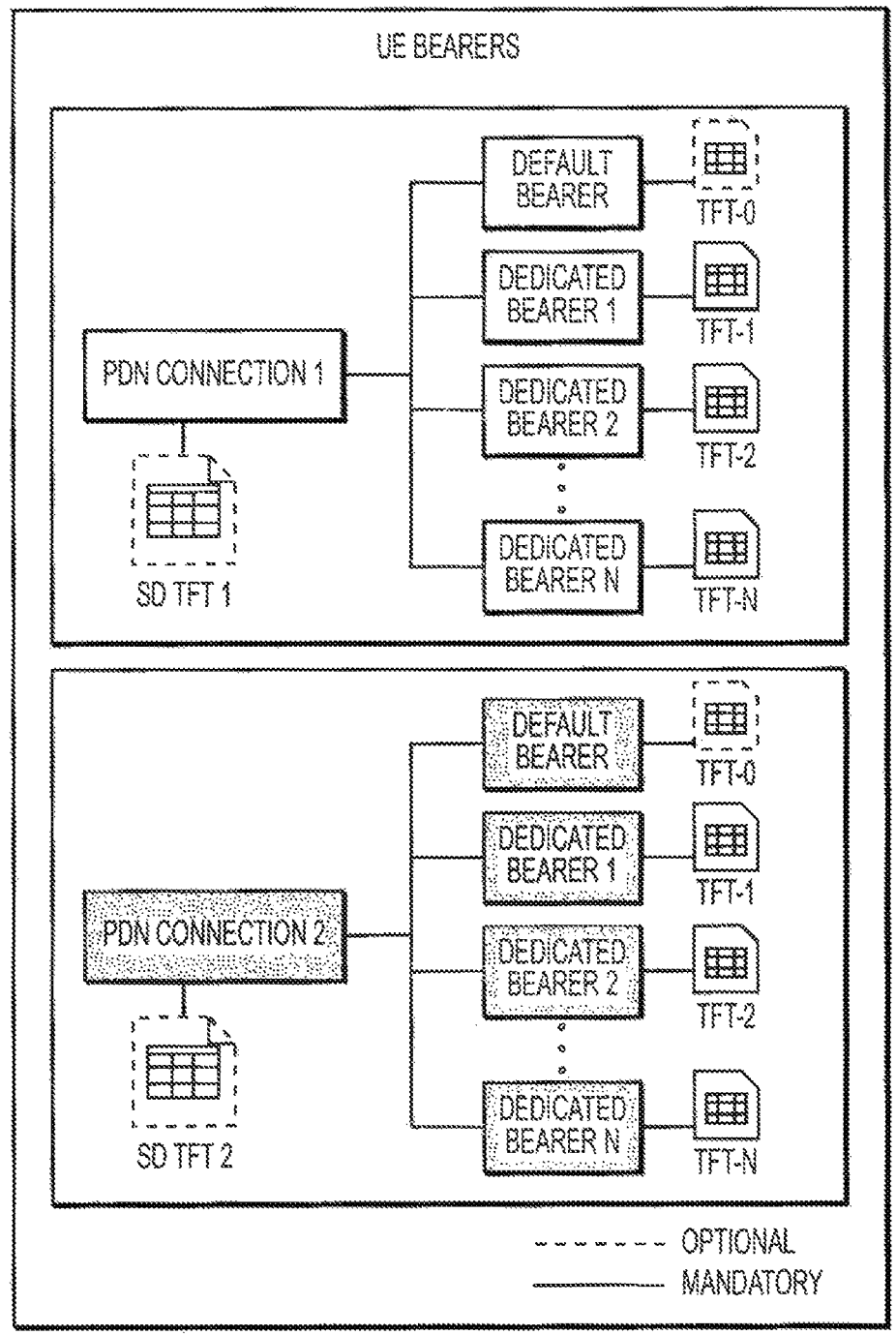
FIG. 13 depicts small data (SD) TFTs linked to packet data network (PDN) connections, in accordance with an example embodiment.

In accordance with an example embodiment, the existing TFT concept for identifying IP flows is extended for Small Data, and the core network can use a separate TFT to inform the UE of which IP flows needs to be considered as Small Data flows. As disclosed herein, a new Small Data TFT can be used that contains the packet filters to match the Small Data IP flows. Referring to FIG. 13, in accordance with the illustrated embodiment, this TFT is linked to a PDN connection, rather than a particular bearer. The TFT is linked to the PDN connection, for example, because during IDLE mode to connected transition, a given UE first selects the PDN connection through which the uplink data is sent. The UE then searches for TFTs in the PDN connection. Continuing with the example, if the SD TFT is per PDN connection, then the UE can first look for the packet data filter match in SD TFT (before looking for other TFTs). If there is a match, the UE performs small data procedures instead of the regular service procedure. This may reduce transactions with the CN to identify whether the data is small data or not. The Small Data TFTs can be created by the network during a PDN connection setup or dynamically through the bearer modification procedure.

In an example embodiment, the Small Data TFT is evaluated by a given UE only during IDLE mode to CONNECTED mode transition. When the UE has uplink data to send and when the UE is IDLE mode, then the UE may first determine the PDN connection to which the uplink data needs to be sent. This may be determined by the UE based on the source IP address of the uplink data. After the PDN connection is determined, for example, then the UE checks if a Small Data TFT is available for this PDN connection. If it is available, for example, the UE checks to determine whether the uplink data that it has matches any of the packet filters in this TFT. If there is a match, the UE may perform the Small Data transfer procedures instead of the regular service request procedure. In an example, the 'Packet filter evaluation precedence' is not used while performing the matching for packet filters in the SD TFT. The 'Packet filter evaluation precedence' of packet filters in SD TFT need not be unique with other packet filters in the TFTs of other bearers belonging to this PDN connection. The 'Packet filter evaluation precedence' value can be set to a reserved value for the packet filters in SD TFT. In an example, the packet filters in the SD TFT are not matched during connected mode when the UE needs to determine the bearer that needs to carry the data. In this example case, the regular TFT matching may be performed without considering the packet filters in the SD TFT.

In accordance with various embodiments, subscriber profiles in the HSS/HLR/UDR can be updated with the following details, presented by way of example and without limitation: whether the subscriber is allowed and/or capable of performing Small Data procedures and the type of procedure that is allowed; whether all the data from the UE should use the Small Data plane, which can be used to restrict the UE to connect to only Small Data services; and whether certain PDN connections should use the Small Data plane.

During Initial Attach, the MME, S-GW, or P-GW may retrieve the above information along with the subscriber information in the Insert Subscriber Data message that is described in 3GPP TS 29.272, "Mobility Management Entity (MME) and Serving GPRS Support Node (SGSN) related interfaces based on Diameter Protocol." The above information can be used by the MME, S-GW, or P-GW to authorize Small Data connection requests from the UE, and also to apply restrictions for Small Data services. The MME, S-GW, or P-GW may pass this information to the UE in a message, such as the Attach Accept message for example. This information may also be used by the MME, S-GW, or P-GW to decide whether data should be delivered to/from the UE using a small data delivery method such as, for example, SMS, NAS messaging, RRC messaging, etc. Alternatively, the MME, S-GW, or P-GW may retrieve the above information along with the subscriber information with the Update Location Request message which is also described in 3GPP TS 29.272.

Thus, in some cases, an apparatus, for instance an apparatus comprising an MME, may receive a first message from a UE. The first message may include an attach request (see FIG. 1A) that includes an indication that the UE supports small data procedures. Alternatively, or additionally, the first message may comprise an attach request that includes a request that the UE use small data procedures. The apparatus may also receive a second message from a network node, for instance an HSS. The second message may be indicative of one or more PDN connections that should use small data procedures. The second message may also be indicative of a type of small data procedure that corresponds to each of the one or more PDN connections. Based on the second message, the apparatus may respond to the first message. For example, as described further below, the response may comprise an attach response message (see FIG. 1A) that includes an indication that the UE should behave in a small data mode that uses one of the small data procedures indicated in the second message. The apparatus may then deliver data using one of the small data procedures indicated in the second message. The apparatus may also receive data from the UE in accordance with one of the small data procedures indicated in the second message. Further, the small data procedure may be indicated via NAS messaging.

In another example embodiment, operators may configure the subscriber profile in the SPR/UDR with Small Data information. The following information can be configured in the SPR/UDR, presented by way of example and without limitation:

The services and IP flow information (service data flow filters—see below) that are to be considered as Small Data.

The traffic characteristics of Small data, such as, for example, packet size, packet frequency, etc. Table 1 of the Appendix provides example characteristics. PCC architecture elements (e.g., PCRF, PCEF, BBERF, and TDF) can use this information to determine the Small Data flows.

A list of AS/SCS's that can provide small data information to the network (PCRF) and a flag indicating if the information from AS/SCS can override the information provided from SPR/UDR to the PCRF. An example of this procedure is described in detail above. In an example, the PCRF can accept SD information only from an authorized AS/SCS.

In an example, the AS/SCS can also store Small Data information in the UDR, which can be retrieved by the PCRF and applied on the network. An example of this procedure is described above. It will be appreciated that a similar configuration in SPR is applicable in GPRS and UMTS networks.

As mentioned above, EMM and ESM Messages may be modified in accordance with an example embodiment. Referring to Table 3 of the Appendix, information elements of an example Attach Request message are shown. This message is modified to inform the MME about the Small Data capabilities of the UE and its request to attach in Small Data mode. Thus, as shown in Table 3, the Small Data Indication IE (described above) is added, and the UE network capability IE is modified. In an alternative example, an existing information element, such as the "EPS attach type" or "MS network capability" for example, may be used to carry a small data indication.

Referring now to Table 4 of the Appendix, an Attach Accept message may be modified in accordance with an example embodiment. The Attach Accept message, which may also be referred to as an attach response message, may include an indication that the UE behave in a small data mode that uses one of the small data procedures that was retrieved from a subscriber repository, for instance an HSS. The attach acceptance or response message may also be modified to inform the UE whether the UE has to behave in a Small Data mode for the entire duration that it stays attached with the network. The Small Data Indication IE can be added to the Attach Accept message. In an alternative example, a small data indication can be added to an existing IE, such as the 'Spare half octet' of the 'EPS Attach Result' IE for example.

Referring to Table 5 of the Appendix, information elements of an example PDN Connectivity request message are shown. This message is modified to request that the network marks the default bearer for Small Data. Thus, as shown in Table 5, the Small Data Indication IE is added.

Referring to Table 6 of the Appendix, information elements of an example Bearer Resource Allocation Request message are shown. This example message is modified to request for marking dedicated bearer for Small Data and/or for providing new Small Data IP flow filters. Thus, as shown, the Small Data Indication IE is added, and the Traffic Flow Aggregate IE may be modified.

Referring to Table 7 of the Appendix, information elements of an example Bearer Resource Modification Request message are shown. This example message is modified to request for changing the status of the Small Data marking of a bearer, or to modify the status of the Small Data IP flow packet filters. Thus, as shown, the Small Data Indication IE is added, and the Traffic Flow Aggregate IE may be modified.

Referring to Table 8 of the Appendix, information elements of an example Activate Default EPS Bearer Context Request message are shown. This example message is modified to provide an indication of whether the default bearer has to be considered as a Small Data bearer. Thus, as shown, the Small Data Indication IE may be added.

Referring to Table 9 of the Appendix, information elements of an example Activate Dedicated EPS Bearer Context Request message are shown. This example message is modified to provide an indication of whether the dedicated bearer has to be considered as a Small Data bearer. Thus, as shown, the Small Data Indication IE may be added, and the TFT IE may be modified as described above. This message may also provide small data packet filters to the UE. In an example, still referring to Table 9, if the Small Data Indication IE is present in this message and if it indicates SD bearer, then all data on this bearer will be considered as SD. By way of further example, if the Small Data Indication IE is present and if it indicates a normal bearer, but the TFT has a packet filter for Small Data, then the data matching the packet filter will be still be considered as Small Data.

Referring now to Table 10 of the Appendix, information elements of an example Modify EPS Bearer Context Request message are shown. This example message may be modified to inform the UE about the dynamic modification of a bearer as an SD bearer, or to change the small data packet filters in a TFT. Thus, as shown, the Small Data Indication IE may be added, and the TFT IE may be modified as described above. Further, with general reference to Tables 11 and 12, a first node, for instance the SCS 100, can provision a second node based on a trigger. The second node, for instance the PCRF, can be provisioned by the first node with information associated with a data flow and an application, such that the second node can determine a rule for selecting a method that should be used to deliver information to the application or receive information from the application. The second node can provision a third node, for instance the P-GW/PCEF, with the rule for selecting what delivery method should be used to deliver information to the application or receive information from the application. A user equipment can host the application. As described above, the third node can use an Activate Dedicated EPS bearer context request message or a Modify EPC bearer context request message to deliver the rule for the UE to use. Furthermore, the third node may compare the data flow information to observed behavior of the data, and thus the third node can take action associated with the comparison, such as terminating the data flow or informing the second node of the result of comparison. Alternatively, as described above, the second node can be a subscription database, and the subscription database can be provisioned over the interface.

New information elements (IEs) are disclosed herein, and existing IEs are modified herein, in accordance with various embodiments. For example, the UE Network Capability IE may be modified to indicate the capability of the UE to support Small Data procedures. The complete definition of this IE and coding details are listed in section 9.9.3.34 of 3GPP TS 24.301, "Non-Access-Stratum (NAS) protocol for Evolved Packet System (EPS)". FIG. 18 shows an example of a modified UE Network Capability in accordance with an example embodiment. As shown, bit 7 of octet 7 (which was marked as spare originally) can be used by the UE to indicate its capability to support Small Data.

The Small Data Indication IE is used throughout this disclosure. The Small Data Indication information element may inform a given UE of whether the UE needs to operate in Small Data mode. The Small Data Indication information element may be coded as shown in FIG. 19 and in Table 11 of the Appendix. In an example, the Small Data Indication is a type 1 information element.

As described above, the Packet Filter List is a part of the TFT IE. The TFT IE is defined in Section 10.5.6.12 of 3GPP TS 24.008. Example changes to the packet filter list coding are shown in FIG. 20, wherein the example changes are underlined. Table 12 of the Appendix shows example Packet Filter Type Values, in accordance with various embodiments.

Referring now to FIG. 14, 3GPP TS 24.305, "Selective Disabling of 3GPP User Equipment Capabilities (SDoUE) Management Object (MO)", defines a management object that can be used to selectively enable and disable various UE capabilities. In accordance with an example embodiment, the management object may be enhanced to allow certain small data flow capabilities to be enabled and disabled. By way of example, referring to an example graphical user interface 1400 depicted in FIG. 14, a leaf object can be added to enable and disable the transmission and reception of data packets via control plane messaging, such as NAS and RRC messaging. A leaf object can be added to limit the number and frequency of packets via control plane messaging such as NAS and RRC messaging. A UE may include a GUI, for instance the GUI 1400, that allows the user to enable and disable the transmission and reception of data packets via control plane messaging. The GUI may also allow the user to limit the number and frequency of packets via control plane messaging. It will be understood that the GUI can be used to monitor and control alternative parameters as desired. It will further be understood that GUIs can provide a user with various information in which the user is interested via a variety of charts or alternative visual depictions. For example, the GUI may adjust the leaf object settings based on the GUI settings, or the GUI may be associated with an application that detects other conditions and adjusts the leaf objects based on the GUI settings and real time operating conditions of the UE. For example, the GUI may allow the user to limit the number of control plane messages that can be sent per hour. When an application detects that the UE has reached its limit of control plane messaging, it may adjust a setting on a leaf object to disable data packets via control plane messaging. Later, after some time has elapsed for example, the application may re-enable data packets via control plane messaging by again adjusting a setting on a leaf object.

As described above, the various techniques described herein may be implemented in connection with hardware, firmware, software or, where appropriate, combinations thereof. Such hardware, firmware, and software may reside in apparatuses located at various nodes of a communication network. The apparatuses may operate singly or in combination with each other to effect the methods described herein. As used herein, the terms "apparatus," "network apparatus," "node," "device," and "network node" may be used interchangeably.

Figure 15A:
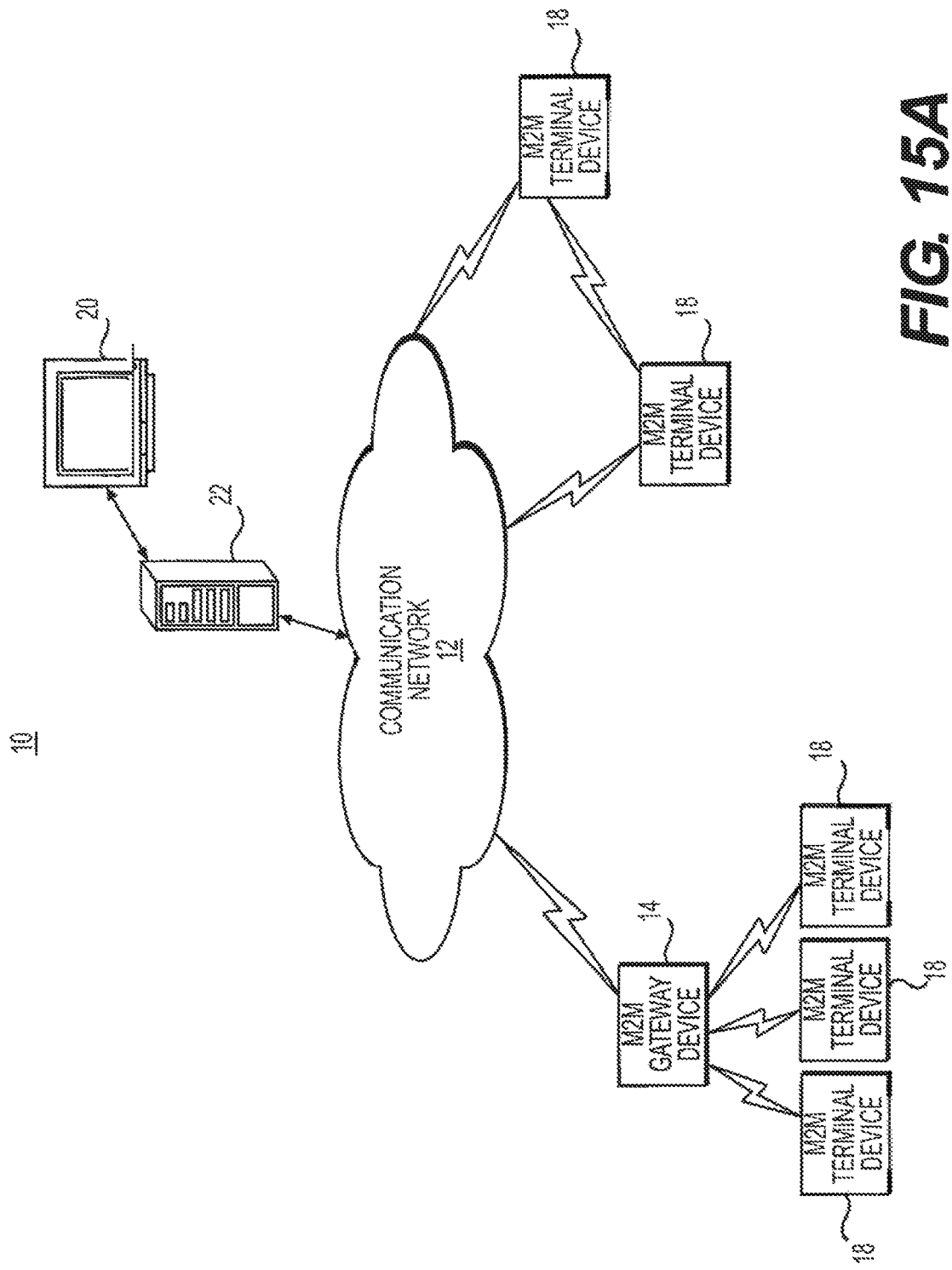
FIG. 15A is a system diagram of an example machine-to-machine (M2M) or Internet of Things (IoT) communication system in which one or more disclosed embodiments may be implemented.

FIG. 15A is a diagram of an example machine-to-machine (M2M), Internet of Things (IoT), or Web of Things (WoT) communication system 10 in which one or more disclosed embodiments may be implemented. Generally, M2M technologies provide building blocks for the IoT/WoT, and any M2M device, M2M gateway or M2M service platform may be a component of the IoT/WoT as well as an IoT/WoT service layer, etc. Any of the client, proxy, or server devices illustrated in any of FIGS. 4-6, 8-11, and 13-14 may comprise a node of a communication system such as the one illustrated in FIGS. 15A-D.

As shown in FIG. 15A, the M2M/IoT/WoT communication system 10 includes a communication network 12. The communication network 12 may be a fixed network (e.g., Ethernet, Fiber, ISDN, PLC, or the like) or a wireless network (e.g., WLAN, cellular, or the like) or a network of heterogeneous networks. For example, the communication network 12 may comprise of multiple access networks that provides content such as voice, data, video, messaging, broadcast, or the like to multiple users. For example, the communication network 12 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like. Further, the communication network 12 may comprise other networks such as a core network, the Internet, a sensor network, an industrial control network, a personal area network, a fused personal network, a satellite network, a home network, or an enterprise network for example.

As shown in FIG. 15A, the M2M/IoT/WoT communication system 10 may include the Infrastructure Domain and the Field Domain. The Infrastructure Domain refers to the network side of the end-to-end M2M deployment, and the Field Domain refers to the area networks, usually behind an M2M gateway. The Field Domain and Infrastructure Domain may both comprise a variety of different nodes (e.g., servers, gateways, devices, of the network. For example, the Field Domain may include M2M gateways 14 and terminal devices 18. It will be appreciated that any number of M2M gateway devices 14 and M2M terminal devices 18 may be included in the M2M/IoT/WoT communication system 10 as desired. Each of the M2M gateway devices 14 and M2M terminal devices 18 are configured to transmit and receive signals via the communication network 12 or direct radio link. A M2M gateway device 14 allows wireless M2M devices (e.g. cellular and non-cellular) as well as fixed network M2M devices (e.g., PLC) to communicate either through operator networks, such as the communication network 12 or direct radio link. For example, the M2M devices 18 may collect data and send the data, via the communication network 12 or direct radio link, to an M2M application 20 or M2M devices 18. The M2M devices 18 may also receive data from the M2M application 20 or an M2M device 18. Further, data and signals may be sent to and received from the M2M application 20 via an M2M service layer 22, as described below. M2M devices 18 and gateways 14 may communicate via various networks including, cellular, WLAN, WPAN (e.g., Zigbee, 6LoWPAN, Bluetooth), direct radio link, and wireline for example. Exemplary M2M devices include, but are not limited to, tablets, smart phones, medical devices, temperature and weather monitors, connected cars, smart meters, game consoles, personal digital assistants, health and fitness monitors, lights, thermostats, appliances, garage doors and other actuator-based devices, security devices, and smart outlets.

The term "service layer" refers to a functional layer within a network service architecture. Service layers are typically situated above the application protocol layer such as HTTP, CoAP or MQTT, and provide value added services to client applications. The service layer also provides an interface to core networks at a lower resource layer, such as for example, a control layer and transport/access layer. The service layer supports multiple categories of (service) capabilities or functionalities including service definition, service runtime enablement, policy management, access control, and service clustering. Recently, several industry standards bodies (e.g., one M2M) have been developing M2M service layers to address the challenges associated with the integration of M2M types of devices and applications into deployments such as the Internet/Web, cellular, enterprise, and home networks. An M2M service layer can provide applications and/or various devices with access to a collection of, or a set of, the above mentioned capabilities or functionalities, supported by the service layer, which can be referred to as a CSE or SCL. A few examples include but are not limited to security, charging, data management, device management, discovery, provisioning, and connectivity management which can be commonly used by various applications. These capabilities or functionalities are made available to such various applications via APIs that make use of message formats, resource structures, and resource representations defined by the M2M service layer. The CSE or SCL is a functional entity that may be implemented by hardware and/or software and that provides (service) capabilities or functionalities exposed to various applications and/or devices (e.g., functional interfaces between such functional entities) in order for them to use such capabilities or functionalities.

Figure 15B:
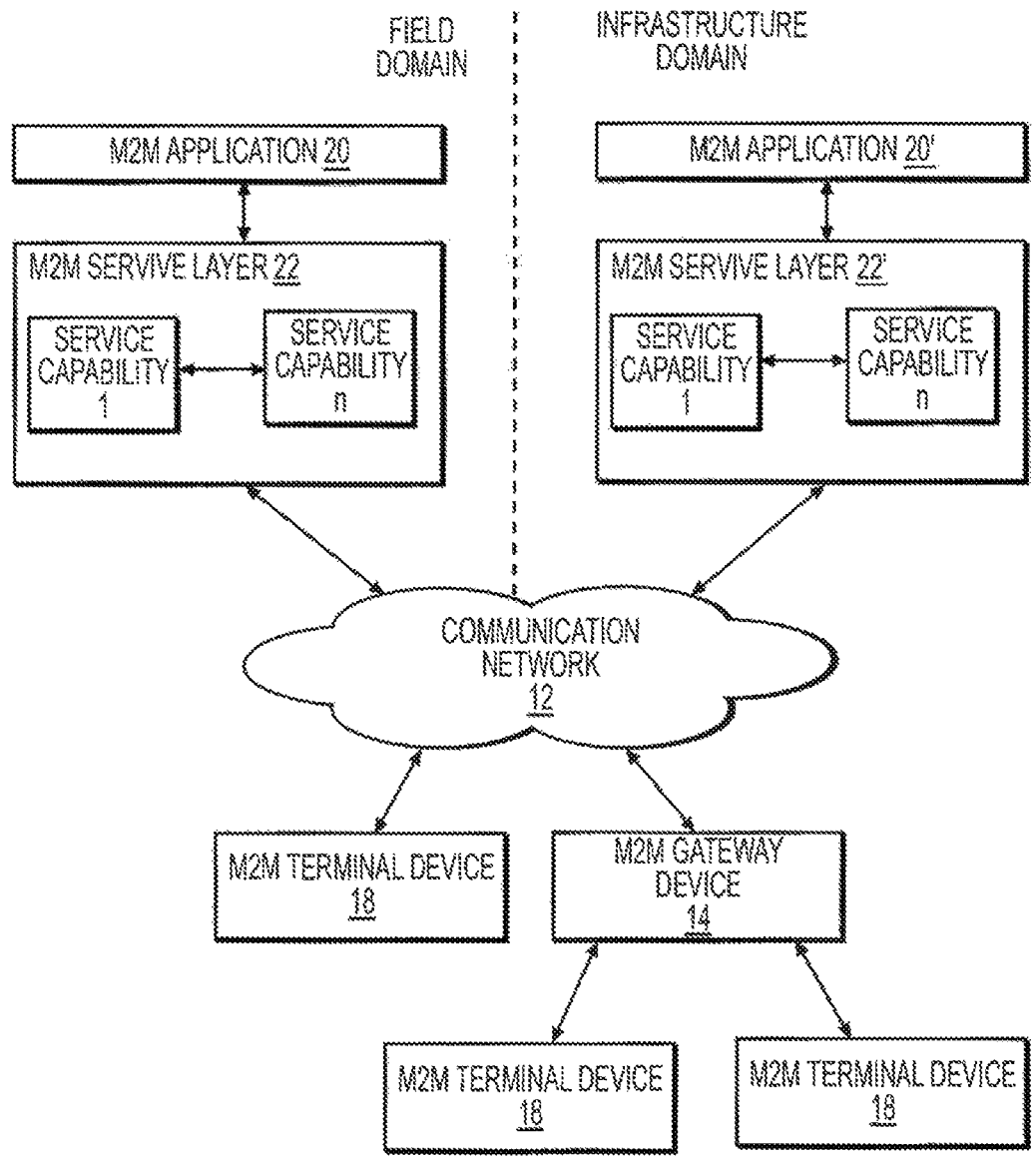
FIG. 15B is a system diagram of an example architecture that may be used within the M2M /IoT communications system illustrated in FIG. 15A.

Referring to FIG. 15B, the illustrated M2M service layer 22 in the field domain provides services for the M2M application 20, M2M gateway devices 14, and M2M terminal devices 18 and the communication network 12. It will be understood that the M2M service layer 22 may communicate with any number of M2M applications, M2M gateway devices 14, M2M terminal devices 18, and communication networks 12 as desired. The M2M service layer 22 may be implemented by one or more servers, computers, or the like. The M2M service layer 22 provides service capabilities that apply to M2M terminal devices 18, M2M gateway devices 14 and M2M applications 20. The functions of the M2M service layer 22 may be implemented in a variety of ways, for example as a web server, in the cellular core network, in the cloud, etc.

Similar to the illustrated M2M service layer 22, there is the M2M service layer 22' in the Infrastructure Domain. M2M service layer 22' provides services for the M2M application 20' and the underlying communication network 12' in the infrastructure domain. M2M service layer 22' also provides services for the M2M gateway devices 14 and M2M terminal devices 18 in the field domain. It will be understood that the M2M service layer 22' may communicate with any number of M2M applications, M2M gateway devices and M2M terminal devices. The M2M service layer 22' may interact with a service layer by a different service provider. The M2M service layer 22' may be implemented by one or more servers, computers, virtual machines (e.g., cloud/compute/storage farms, etc.) or the like.

Still referring to FIG. 15B, the M2M service layer 22 and 22' provide a core set of service delivery capabilities that diverse applications and verticals can leverage. These service capabilities enable M2M applications 20 and 20' to interact with devices and perform functions such as data collection, data analysis, device management, security, billing, service/device discovery, etc. Essentially, these service capabilities free the applications of the burden of implementing these functionalities, thus simplifying application development and reducing cost and time to market. The service layer 22 and 22' also enables M2M applications 20 and 20' to communicate through various networks 12 and 12' in connection with the services that the service layer 22 and 22' provide.

The M2M applications 20 and 20' may include applications in various industries such as, without limitation, transportation, health and wellness, connected home, energy management, asset tracking, and security and surveillance. As mentioned above, the M2M service layer, running across the devices, gateways, and other servers of the system, supports functions such as, for example, data collection, device management, security, billing, location tracking/geofencing, device/service discovery, and legacy systems integration, and provides these functions as services to the M2M applications 20 and 20'.

Generally, a service layer (SL), such as the service layers 22 and 22' illustrated in FIGS. 15A and 15B, defines a software middleware layer that supports value-added service capabilities through a set of application programming interfaces (APIs) and underlying networking interfaces. Both the ETSI M2M and one M2M architectures define a service layer. ETSI M2M's service layer is referred to as the Service Capability Layer (SCL). The SCL may be implemented in a variety of different nodes of the ETSI M2M architecture. For example, an instance of the service layer may be implemented within an M2M device (where it is referred to as a device SCL (DSCL)), a gateway (where it is referred to as a gateway SCL (GSCL)) and/or a network node (where it is referred to as a network SCL (NSCL)). The one M2M service layer supports a set of Common Service Functions (CSFs) (i.e. service capabilities). An instantiation of a set of one or more particular types of CSFs is referred to as a Common Services Entity (CSE), which can be hosted on different types of network nodes (e.g. infrastructure node, middle node, application-specific node). The Third Generation Partnership Project (3GPP) has also defined an architecture for machine-type communications (MTC). In that architecture, the service layer, and the service capabilities it provides, are implemented as part of a Service Capability Server (SCS). Whether embodied in a DSCL, GSCL, or NSCL of the ETSI M2M architecture, in a Service Capability Server (SCS) of the 3GPP MTC architecture, in a CSF or CSE of the one M2M architecture, or in some other node of a network, an instance of the service layer may be implemented in a logical entity (e.g., software, computer-executable instructions, and the like) executing either on one or more standalone nodes in the network, including servers, computers, and other computing devices or nodes, or as part of one or more existing nodes. As an example, an instance of a service layer or component thereof (e.g., the AS/SC S 100) may be implemented in the form of software running on a network node (e.g., server, computer, gateway, device, or the like) having the general architecture illustrated in FIG. 15C or 15D described below.

Further, the methods and functionalities described herein may be implemented as part of an M2M network that uses a Service Oriented Architecture (SOA) and/or a resource-oriented architecture (ROA) to access services, such as the above-described Network and Application Management Service for example.

Figure 15C:
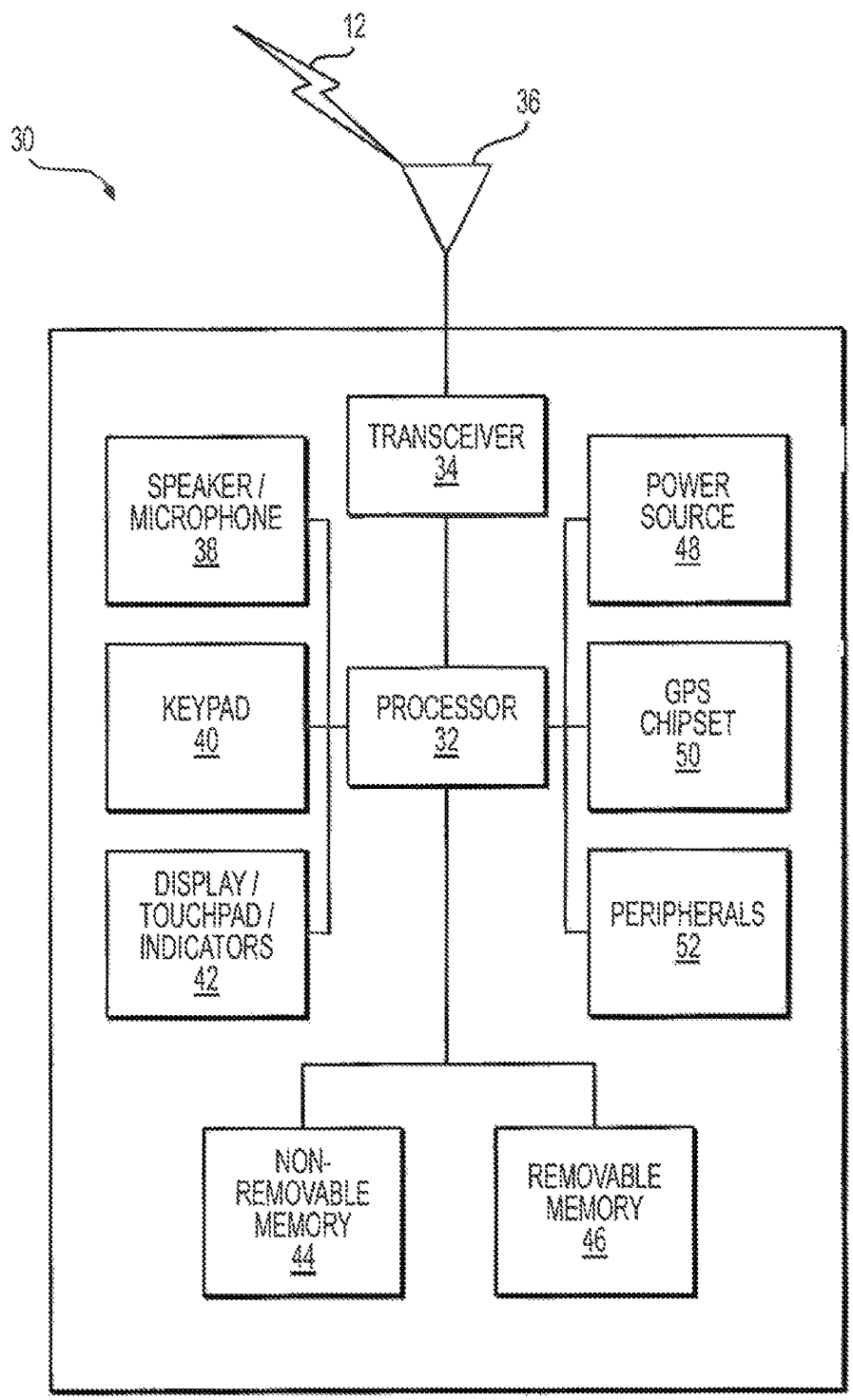
FIG. 15C is a system diagram of an example M2M/IoT terminal or gateway device that may be used within the communications system illustrated in FIG. 15A.

FIG. 15C is a block diagram of an example hardware/software architecture of a node of a network, such as one of the clients, servers, or proxies illustrated in Figs. FIGS. 4-6, 8-11, and 13-14 which may operate as an M2M server, gateway, device, or other node in an M2M network such as that illustrated in FIGS. 15A and 15B. As shown in FIG. 15C, the node 30 may include a processor 32, a transceiver 34, a transmit/receive element 36, a speaker/microphone 38, a keypad 40, a display/touchpad 42, non-removable memory 44, removable memory 46, a power source 48, a global positioning system (GPS) chipset 50, and other peripherals 52. The node 30 may also include communication circuitry, such as a transceiver 34 and a transmit/receive element 36. It will be appreciated that the node 30 may include any sub-combination of the foregoing elements while remaining consistent with an embodiment. This node may be a node that implements the small data functionality described herein.

The processor 32 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 32 may perform signal coding, data processing, power control, input/output processing, and/or any other functionality that enables the node 30 to operate in a wireless environment. The processor 32 may be coupled to the transceiver 34, which may be coupled to the transmit/receive element 36. While FIG. 15C depicts the processor 32 and the transceiver 34 as separate components, it will be appreciated that the processor 32 and the transceiver 34 may be integrated together in an electronic package or chip. The processor 32 may perform application-layer programs (e.g., browsers) and/or radio access-layer (RAN) programs and/or communications. The processor 32 may perform security operations such as authentication, security key agreement, and/or cryptographic operations, such as at the access-layer and/or application layer for example.

As shown in FIG. 15C, the processor 32 is coupled to its communication circuitry (e.g., transceiver 34 and transmit/receive element 36). The processor 32, through the execution of computer executable instructions, may control the communication circuitry in order to cause the node 30 to communicate with other nodes via the network to which it is connected. In particular, the processor 32 may control the communication circuitry in order to perform the transmitting and receiving steps described herein (e.g., in FIGS. 5-16, 18-22, and 24) and in the claims. While FIG. 15C depicts the processor 32 and the transceiver 34 as separate components, it will be appreciated that the processor 32 and the transceiver 34 may be integrated together in an electronic package or chip.

The transmit/receive element 36 may be configured to transmit signals to, or receive signals from, other nodes, including M2M servers, gateways, devices, and the like. For example, in an embodiment, the transmit/receive element 36 may be an antenna configured to transmit and/or receive RF signals. The transmit/receive element 36 may support various networks and air interfaces, such as WLAN, WPAN, cellular, and the like. In an embodiment, the transmit/receive element 36 may be an emitter/detector configured to transmit and/or receive IR, UV, or visible light signals, for example. In yet another embodiment, the transmit/receive element 36 may be configured to transmit and receive both RF and light signals. It will be appreciated that the transmit/receive element 36 may be configured to transmit and/or receive any combination of wireless or wired signals.

In addition, although the transmit/receive element 36 is depicted in FIG. 15C as a single element, the node 30 may include any number of transmit/receive elements 36. More specifically, the node 30 may employ MIMO technology. Thus, in an embodiment, the node 30 may include two or more transmit/receive elements 36 (e.g., multiple antennas) for transmitting and receiving wireless signals.

The transceiver 34 may be configured to modulate the signals that are to be transmitted by the transmit/receive element 36 and to demodulate the signals that are received by the transmit/receive element 36. As noted above, the node 30 may have multi-mode capabilities. Thus, the transceiver 34 may include multiple transceivers for enabling the node 30 to communicate via multiple RATs, such as UTRA and IEEE 802.11, for example.

The processor 32 may access information from, and store data in, any type of suitable memory, such as the non-removable memory 44 and/or the removable memory 46. The non-removable memory 44 may include random-access memory (RAM), read-only memory (ROM), a hard disk, or any other type of memory storage device. The removable memory 46 may include a subscriber identity module (SIM) card, a memory stick, a secure digital (SD) memory card, and the like. In other embodiments, the processor 32 may access information from, and store data in, memory that is not physically located on the node 30, such as on a server or a home computer. The processor 32 may be configured to control lighting patterns, images, or colors on the display or indicators 42 to reflect the status a UE (e.g., see GUI 1400), and in particular underlying networks, applications, or other services in communication with the UE. The processor 32 may receive power from the power source 48, and may be configured to distribute and/or control the power to the other components in the node 30. The power source 48 may be any suitable device for powering the node 30. For example, the power source 48 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 32 may also be coupled to the GPS chipset 50, which is configured to provide location information (e.g., longitude and latitude) regarding the current location of the node 30. It will be appreciated that the node 30 may acquire location information by way of any suitable location-determination method while remaining consistent with an embodiment.

The processor 32 may further be coupled to other peripherals 52, which may include one or more software and/or hardware modules that provide additional features, functionality, and/or wired or wireless connectivity. For example, the peripherals 52 may include an accelerometer, an e-compass, a satellite transceiver, a sensor, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 15D:
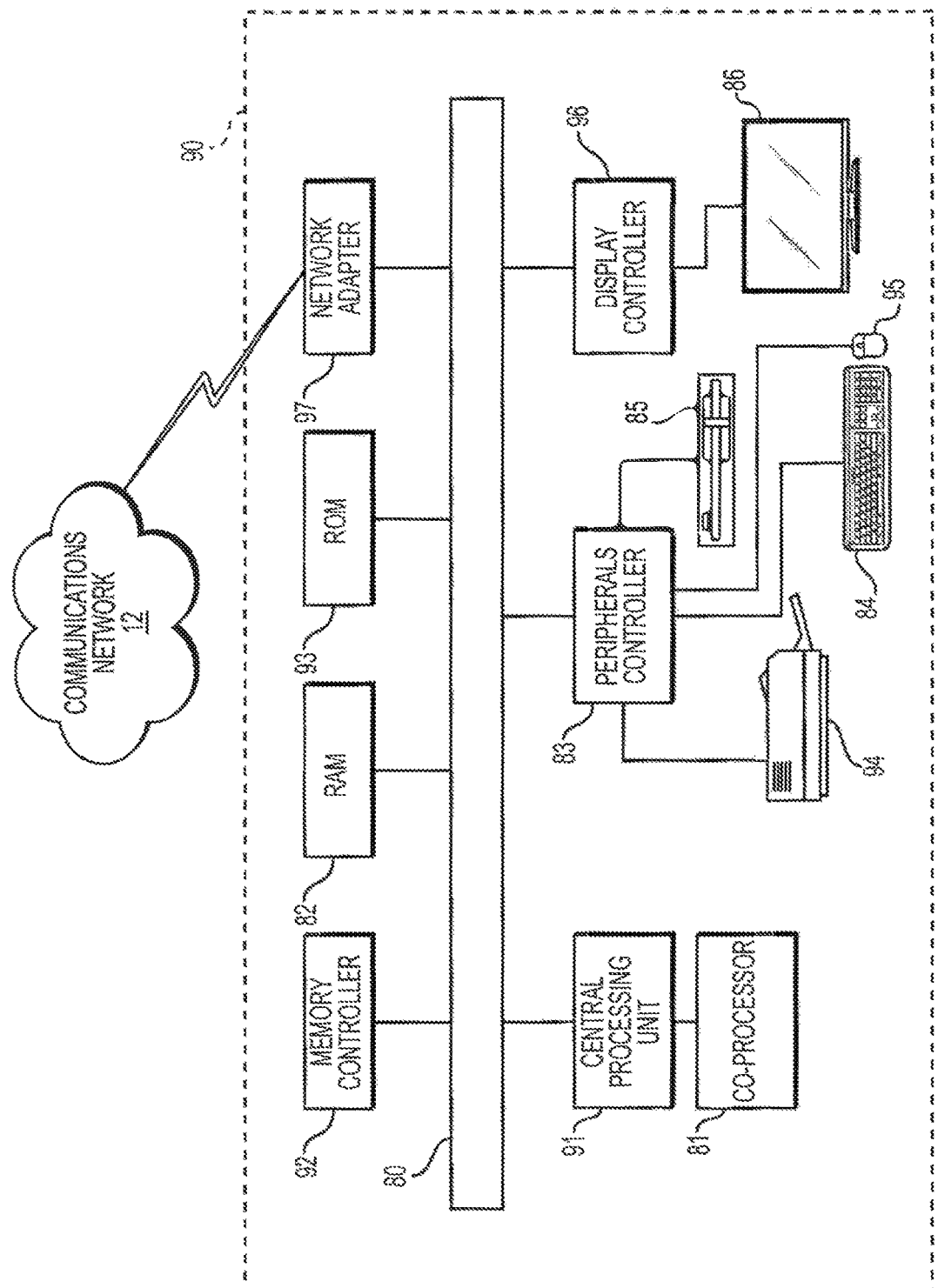
FIG. 15D is a block diagram of an example computing system in which aspects of the communication system of FIG. 15A may be embodied.

FIG. 15D is a block diagram of an exemplary computing system 90 which may also be used to implement one or more nodes of a network, such as the clients, servers, or proxies illustrated in Figs. FIGS. 4-6, 8-11, and 13-14, which may operates as an M2M server, gateway, device, or other node in an M2M network such as that illustrated in FIGS. 15A and 15B. Computing system 90 may comprise a computer or server and may be controlled primarily by computer readable instructions, which may be in the form of software, wherever, or by whatever means such software is stored or accessed. Such computer readable instructions may be executed within central processing unit (CPU) 91 to cause computing system 90 to do work. In many known workstations, servers, and personal computers, central processing unit 91 is implemented by a single-chip CPU called a microprocessor. In other machines, the central processing unit 91 may comprise multiple processors. Coprocessor 81 is an optional processor, distinct from main CPU 91, which performs additional functions or assists CPU 91. CPU 91 and/or coprocessor 81 may receive, generate, and process data related to the disclosed systems and methods for E2E M2M service layer sessions, such as receiving session credentials or authenticating based on session credentials.

In operation, CPU 91 fetches, decodes, and executes instructions, and transfers information to and from other resources via the computer's main data-transfer path, system bus 80. Such a system bus connects the components in computing system 90 and defines the medium for data exchange. System bus 80 typically includes data lines for sending data, address lines for sending addresses, and control lines for sending interrupts and for operating the system bus. An example of such a system bus 80 is the PCI (Peripheral Component Interconnect) bus.

Memory devices coupled to system bus 80 include random access memory (RAM) 82 and read only memory (ROM) 93. Such memories include circuitry that allows information to be stored and retrieved. ROMs 93 generally contain stored data that cannot easily be modified. Data stored in RAM 82 can be read or changed by CPU 91 or other hardware devices. Access to RAM 82 and/or ROM 93 may be controlled by memory controller 92. Memory controller 92 may provide an address translation function that translates virtual addresses into physical addresses as instructions are executed. Memory controller 92 may also provide a memory protection function that isolates processes within the system and isolates system processes from user processes. Thus, a program running in a first mode can access only memory mapped by its own process virtual address space; it cannot access memory within another process's virtual address space unless memory sharing between the processes has been set up.

In addition, computing system 90 may contain peripherals controller 83 responsible for communicating instructions from CPU 91 to peripherals, such as printer 94, keyboard 84, mouse 95, and disk drive 85.

Display 86, which is controlled by display controller 96, is used to display visual output generated by computing system 90. Such visual output may include text, graphics, animated graphics, and video. Display 86 may be implemented with a CRT-based video display, an LCD-based flat-panel display, gas plasma-based flat-panel display, or a touch-panel. Display controller 96 includes electronic components required to generate a video signal that is sent to display 86.

Further, computing system 90 may contain communication circuitry, such as for example a network adaptor 97 that may be used to connect computing system 90 to an external communications network, such as network 12 of FIG. 15A and FIG. 15B, to enable the computing system 90 to communicate with other nodes of the network. The communication circuitry, alone or in combination with the CPU 91, may be used to perform the transmitting and receiving steps described herein (e.g., in FIGS. 4-6, 8-11, and 13-14) and in the claims.

It will be understood that any of the methods and processes described herein may be embodied in the form of computer executable instructions (i.e., program code) stored on a computer-readable storage medium which instructions, when executed by a machine, such as a computer, server, M2M terminal device, M2M gateway device, or the like, perform and/or implement the systems, methods and processes described herein. Specifically, any of the steps, operations or functions described above may be implemented in the form of such computer executable instructions. Computer readable storage media include both volatile and nonvolatile, removable and non-removable media implemented in any method or technology for storage of information, but such computer readable storage media do not include signals. Computer readable storage media include, but are not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other physical medium which can be used to store the desired information and which can be accessed by a computer.

In describing preferred embodiments of the subject matter of the present disclosure, as illustrated in the Figures, specific terminology is employed for the sake of clarity. The claimed subject matter, however, is not intended to be limited to the specific terminology so selected, and it is to be understood that each specific element includes all technical equivalents that operate in a similar manner to accomplish a similar purpose.

Table 13 of the Appendix lists many acronyms relating to service level technologies that may appear herein. Unless otherwise specified, the acronyms used herein refer to the corresponding term listed below.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

APPENDIX

Example1-Updated AA-Request Message
<AA-Request> ::= < Diameter Header: 265, REQ, PXY >
    < Session-Id >
      { Auth-Application-Id }
      { Origin-Host }
    { Origin-Realm }
      { Destination-Realm }
      [ Destination-Host ]
    [IP-Domain-Id ]
      [ AF-Application-Identifier ]
    *[ Media-Component-Description ]
    [Service-Info-Status ]

APPENDIX-continued

```
            [ AF-Charging-Identifier ]
            [ SIP-Forking-Indication ]
           *[ Specific-Action ]
           *[ Subscription-Id ]
           *[ Supported-Features ]
            [ Reservation-Priority ]
            [ Framed-IP-Address ]
            [ Framed-IPv6-Prefix ]
            [ Called-Station-Id ]
            [ Service-URN ]
            [ Sponsored-Connectivity-Data ]
            [ MPS-Identifier ]
            [ Rx-Request-Type ]
           *[ Required-Access-Info]
            [ Origin-State-Id ]
           *[ Proxy-Info ]
           *[ Route-Record ]
           *[ AVP ]
                    Example 2 of the Appendix shows an AVP format.
Media-Component-Description ::= < AVP Header: 517 >
                    { Media-Component-Number } ; Ordinal number of
the media comp.
                   *[ Media-Sub-Component ]      ; Set of flows for
one flow identifier
                    [ AF-Application-Identifier ]
                    [ Media-Type ]
                    [ Max-Requested-Bandwidth-UL ]
                    [ Max-Requested-Bandwidth-DL ]
                    [ Min-Requested-Bandwidth-UL ]
                    [ Min-Requested-Bandwidth-DL ]
                    [ Time-Duration ]; Start and end time for the
BW requirement
                    [ Traffic-Characteristics ]; New AVP
                    [ Traffic-Mode ]
                    [ Flow-Status ]
                    [ Reservation-Priority ]
                    [ RS-Bandwidth ]
                    [ RR-Bandwidth ]
                   *[ Codec-Data ]
         Example 3 of the Appendix shows an example 'Traffic-Characteristics' AVP
Traffic-Characteristics ::=
                    [ Communications-Frequency ] ;
                    [ Duration ]
                    [ Delay_Between_Communications ]
                    [ AF-Application-Identifier ]
                    [ MAX_UL_Packets ]
                    [ MAX_DL_Packets ]
                    [ MAX_Packet_Size ]
                    [ MAX_UL_Packets ]
                              EXAMPLE 4
         Example Message Format: An example updated AAA PARA 67
<AA-Answer> ::=
         < Session-Id >
           { Auth-Application-Id }
           { Origin-Host }
           { Origin-Realm }
           [ Result-Code ]
          [ Experimental-Result ]
          *[ Access-Network-Charging-Identifier ]
           [ Access-Network-Charging-Address ]
           [Acceptable-Service-Info ]
          [ IP-CAN-Type ]
          [RAT-Type ]
          *[ Flows ]
          *[ Supported-Features ]
         *[ Class ]
            [ Error-Message ]
            [ Error-Reporting-Host ]
          *[ Failed-AVP ]
           [ Origin-State-Id ]
               *[ Redirect-Host ]
                [ Redirect-Host-Usage ]
                [ Redirect-Max-Cache-Time ]
          *[ Proxy-Info ]
          *[ AVP ]
            Example 5
Referring to 3 and 9 of Fig. 6, an Application Flow Information (AFI) Request/Answer Message
over Tsp Interface may contain the following AVPs, presented by way of example and without
limitation. Example 5 PARA 73
```

APPENDIX-continued

```
< AFI-Request> ::= < Diameter Header: 265, REQ, PXY >
         < Session-Id >
            { Auth-Application-Id }
            { Origin-Host }
            { Origin-Realm }
            { Destination-Realm }
            [ Destination-Host ]
                [ External-Id]
            [ AF-Application-Identifier ]
            *[ Media-Component-Description ]
            *[ Supported-Features ]
            *[ AVP ]
<AFI-Answer> ::=
         < Session-Id >
            { Auth-Application-Id }
            { Origin-Host }
            { Origin-Realm }
            [ Result-Code ]
                [ External-Id]
            [ Acceptable-Service-Info ]
            *[ Supported-Features ]
            *[ AVP ]
Example 6.
< AFI-Request> ::= < Diameter Header: 265, REQ, PXY >
         < Session-Id >
            { Auth-Application-Id }
            { Origin-Host }
         { Origin-Realm }
            { Destination-Realm }
            [ Destination-Host ]
                [ User-Name]
            [ AF-Application-Identifier ]
            *[ Media-Component-Description ]
            *[ Supported-Features ]
            *[ AVP ]
<AFI-Answer> ::=
         < Session-Id >
            { Auth-Application-Id }
            { Origin-Host }
            { Origin-Realm }
            [ Result-Code ]
                [ User-Name]
            [ Acceptable-Service-Info ]
            *[ Supported-Features ]
            *[ AVP ]
    Example 7 of the Appendix shows a CC-Request (CCR) Command message format.
         Example CC-Request (CCR) CommandMessage Format:
    <CC-Request> ::= < Diameter Header: 272, REQ, PXY >
         < Session-Id >
            { Auth-Application-Id }
            { Origin-Host }
            { Origin-Realm }
            { Destination-Realm }
            { CC-Request-Type }
            { CC-Request-Number }
            [ Destination-Host ]
            [ Origin-State-Id ]
            *[ Subscription-Id ]
            *[ Supported-Features ]
            [ TDF-Information ]
            [ Network-Request-Support ]
            *[ Packet-Filter-Information ]
            [ Packet-Filter-Operation ]
            [ Bearer-Identifier ]
            [ Bearer-Operation ]
            [ Framed-IP-Address ]
            [ Framed-IPv6-Prefix ]
            [ IP-CAN-Type ]
            [ 3GPP-RAT-Type ]
            [RAT-Type ]
            [ Termination-Cause ]
            [ User-Equipment-Info ]
            [ QoS-Information ]
            [ QoS-Negotiation ]
            [ QoS-Upgrade ]
            [ Default-EPS-Bearer-QoS ]
         O*2[ AN-GW-Address ]
            [ 3GPP-SGSN-MCC-MNC ]
            [ 3GPP-SGSN-Address ]
            [ 3GPP-SGSN-IPv6-Address ]
```

APPENDIX-continued

```
            [ 3GPP-GGSN-Address ]
            [ 3GPP-GGSN-IPv6-Address ]
            [ RAI ]
            [ 3GPP-User-Location-Info]
            [3GPP-MS-TimeZone ]
            [ Called-Station-Id ]
            [ PDN-Connection-ID ]
            [ Bearer-Usage ]
            [ Online ]
            [ Offline ]
           *[ TFT-Packet-Filter-Information ]
           *[ Charging-Rule-Report]
    *[ ADC-Rule-Report ]
           *[ Application-Detection-Information ]
           *[ Event-Trigger]
            [ Event-Report-Indication]
            [ Access-Network-Charging-Address ]
           *[ Access-Network-Charging-Identifier-Gx ]
           *[ CoA-Information ]
           *[ Usage-Monitoring-Information ]
            [ Routing-Rule-Install ]
            [ Routing-Rule-Remove ]
            [ Logical-Access-ID ]
            [ Physical-Access-ID ]
           *[ Proxy-Info ]
           *[ Route-Record ]
           *[ AVP ]
```

Example 8 of the Appendix shows a CC-Answer (CCA) command message format.

```
    <CC-Answer> ::= < Diameter Header: 272, PXY >
            < Session-Id >
            { Auth-Application-Id }
            { Origin-Host }
            { Origin-Realm }
            [ Result-Code ]
            [ Experimental-Result ]
            { CC-Request-Type }
            { CC-Request-Number }
           *[ Supported-Features ]
            [ Bearer-Control-Mode ]
           *[ Event-Trigger ]
            [ Origin-State-Id ]
           *[ Redirect-Host ]
            [ Redirect-Host-Usage ]
            [ Redirect-Max-Cache-Time ]
           *[ Charging-Rule-Remove ]
           *[ Charging-Rule-Install ]
    *[ ADC-Rule-Remove ]
    *[ ADC-Rule-Install ]
            [ Charging-Information ]
            [ Online ]
            [ Offline ]
           *[ QoS-Information ]
            [ Revalidation-Time ]
            [ ADC-Revalidation-Time ]
            [ Default-EPS-Bearer-QoS ]
            [ Bearer-Usage ]
            [ 3GPP-User-Location-Info]
           *[ Usage-Monitoring-Information ]
           *[ CSG-Information-Reporting ]
            [ User-CSG-Information ]
            [ Error-Message ]
            [ Error-Reporting-Host ]
           *[ Failed-AVP ]
           *[ Proxy-Info ]
           *[ Route-Record ]
           *[ AVP ]
```

Example 9 of the Appendix shows a Re-Auth-Request (RAR) command message format.

```
    <RA-Request> ::= < Diameter Header: 258, REQ, PXY >
            < Session-Id >
            { Auth-Application-Id }
            { Origin-Host }
            { Origin-Realm }
            { Destination-Realm }
            { Destination-Host }
            { Re-Auth-Request-Type }
            [ Session-Release-Cause ]
            [ Origin-State-Id ]
```

APPENDIX-continued

```
        *[ Event-Trigger ]
         [ Event-Report-Indication ]
         *[ Charging-Rule-Remove ]
         *[ Charging-Rule-Install ]
  *[ ADC-Rule-Remove ]
  *[ ADC-Rule-Install ]
         [ Default-EPS-Bearer-QoS ]
         *[ QoS-Information ]
         [ Revalidation-Time ]
         [ ADC-Revalidation-Time ]
         *[ Usage-Monitoring-Information ]
         *[ Proxy-Info ]
         *[ Route-Record ]
         *[ AVP]
```

TABLE 1

Example AF Session Information

| S. No | Example Information Item | Description |
|---|---|---|
| 1. | Media type | This determines a media type of the session (e.g., voice, video, telemetry, diagnostics, health statistics, etc.), which can be set to the value of "APPLICATION" while provisioning small data flow information. |
| 2. | AF-Application-Identifier | An AF-Application-Identifier may be used as additional information together with the above-described Media-Type AVP.<br>This Identifier can include information concerning an M2M small data application, such as information that identifies a particular service to which the AF service session belongs. For example, this element may be used by the PCRF to differentiate QoS for different applications or services. |
| 3. | Bandwidth requirements for different time intervals | The bandwidth (e.g., bit rate) requirements that are passed to the PCRF can be enhanced to contain a time duration during which the specified bandwidth is required. For example, multiple instances of this information may be sent for a single application/service to specify different bandwidth requirements for different time intervals. |
| 4. | Traffic behavior (or pattern) description | In accordance with an example embodiment, new information is added to describe the traffic pattern or behavior of communications between peer applications. Such information may indicate, presented by way of example and without limitation:<br>  a. Number of communications per some time interval<br>    In one example, this conveys how many times within a specific time period that the applications would communicate with each other. By way of example, this information element might indicate that there will be 5 communications per hour, which means that the applications would communicate with each other 5 times within one hour. Maximum and minimum values can also be provided.<br>  b. Time delay between the communications.<br>    This may indicate the amount of time that applications would be idle (e.g., without any data transfer between them) before they initiate a next communication session.<br>    This data may contain the maximum and minimum idle time periods.<br>  c. Number of packets transmitted<br>    This information element may be specified in terms of, for example, the number of packets that would be transmitted per communication session or the total number of packets for a time duration. This data may also be indicated in a min-max range value.<br>  d. Packet size<br>    This data may indicate a maximum size of the packets that can be transmitted within the duration.<br>  e. Duration<br>    This data may indicate a duration for which the traffic pattern being described applies.<br>  f. Delay Tolerance<br>    This data may indicate an acceptable delay duration in packets delivery. |
| 5. | Traffic Type | A traffic type information item may indicate the mode in which the application is currently operating. Various values may be provided, such as, for example and without limitation:<br>    1. heavy (e.g., for video streaming)<br>    2. medium (e.g., for web-browsing)<br>    3. low (e.g., keep-alive)<br>    4. idle<br>        . . . etc.<br>This information can be used to convey data patterns of an application. In some cases, instead of determining a Small Data need from the information provided in the field above, a PCRF can use this information to quickly determine the Small Data need. By way of example, the PCRF can use the "traffic type" method when it trusts the AF and/or delegates the Small Data identification to the AF. |

TABLE 2

| QCI | Resource Type | Priority | Packet Delay Budget (NOTE 1) | Packet Error Loss Rate (NOTE 2) | Example Services |
|---|---|---|---|---|---|
| 1 (NOTE 3) | GBR | 2 | 100 ms | $10^{-2}$ | Conversational Voice |
| 2 (NOTE 3) | | 4 | 150 ms | $10^{-3}$ | Conversational Video (Live Streaming) |
| 3 (NOTE 3) | | 3 | 50 ms | $10^{-3}$ | Real Time Gaming |
| 4 (NOTE 3) | | 5 | 300 ms | $10^{-6}$ | Non-Conversational Video (Buffered Streaming) |
| 5 (NOTE 3) | Non-GBR | 1 | 100 ms | $10^{-6}$ | IMS Signalling |
| 6 (NOTE 4) | | 6 | 300 ms | $10^{-6}$ | Video (Buffered Streaming) TCP-based (e.g., www, e-mail, chat, ftp, p2p file sharing, progressive video, etc.) |
| 7 (NOTE 3) | | 7 | 100 ms | $10^{-3}$ | Voice, Video (Live Streaming) Interactive Gaming |
| 8 (NOTE 5) | | 8 | 300 ms | $10^{-6}$ | Video (Buffered Streaming) TCP-based (e.g., www, e-mail, chat, ftp, p2p file sharing, progressive video, etc.) |
| 9 (NOTE 6) | | 9 | | | |
| 10 | | 10 | 500 ms | $10^{2}$ | Delay tolerant Small Data services |
| 11 | | 11 | 500 ms | $10^{6}$ | Delay tolerant, low packet loss Small Data services. |

Table 2 - Notes (NOTE 1): A delay of 20 ms for the delay between a PCEF and a radio base station should be subtracted from a given PDB to derive the packet delay budget that applies to the radio interface. This delay is the average between the case where the PCEF is located "close" to the radio base station (roughly 10 ms) and the case where the PCEF is located "far" from the radio base station, e.g. in case of roaming with home routed traffic (the one-way packet delay between Europe and the US west coast is roughly 50 ms). The average takes into account that roaming is a less typical scenario. It is expected that subtracting this average delay of 20 ms from a given PDB will lead to desired end-to-end performance in most typical cases. Also, note that the PDB defines an upper bound. Actual packet delays - in particular for GBR traffic - should typically be lower than the PDB specified for a QCI as long as the UE has sufficient radio channel quality.
(NOTE 2): The rate of non-congestion related packet losses that may occur between a radio base station and a PCEF should be regarded to be negligible. A PELR value specified for a standardized QCI therefore applies completely to the radio interface between a UE and radio base station.
(NOTE 3): This QCI is typically associated with an operator controlled service, i.e., a service where the SDF aggregate's uplink/downlink packet filters are known at the point in time when the SDF aggregate is authorized. In case of E-UTRAN this is the point in time when a corresponding dedicated EPS bearer is established/modified.
(NOTE 4): If the network supports Multimedia Priority Services (MPS) then this QCI could be used for the prioritization of non real-time data (i.e. most typically TCP-based services/applications) of MPS subscribers.
(NOTE 5): This QCI could be used for a dedicated "premium bearer" (e.g. associated with premium content) for any subscriber/subscriber group. Also in this case, the SDF aggregate's uplink/downlink packet filters are known at the point in time when the SDF aggregate is authorized. Alternatively, this QCI could be used for the default bearer of a UE/PDN for "premium subscribers".
(NOTE 6): This QCI is typically used for the default bearer of a UE/PDN for non-privileged subscribers. Note that AMBR can be used as a "tool" to provide subscriber differentiation between subscriber groups connected to the same PDN with the same QCI on the default bearer.

TABLE 3

| IEI | Information Element | Type/Reference | Presence | Format | Length |
|---|---|---|---|---|---|
| | Protocol discriminator | Protocol discriminator | M | V | ½ |
| | Security header type | Security header type | M | V | ½ |
| | Attach request message identity | Message type | M | V | 1 |
| | EPS attach type | EPS attach type | M | V | ½ |
| | NAS key set identifier | NAS key set identifier | M | V | ½ |
| | EPS mobile identity | EPS mobile identity | M | LV | 5-12 |
| | UE network capability | UE network capability | M | LV | 3-14 |
| | ESM message container | ESM message container | M | LV-E | 5-n |
| 19 | Old P-TMSI signature | P-TMSI signature | O | TV | 4 |
| 50 | Additional GUTI | EPS mobile identity | O | TLV | 13 |
| 52 | Last visited registered TAI | Tracking area identity | O | TV | 6 |
| 5C | DRX parameter | DRX parameter | O | TV | 3 |
| 31 | MS network capability | MS network capability | O | TLV | 4-10 |
| 13 | Old location area identification | Location area identification | O | TV | 6 |
| 9- | TMSI status | TMSI status | O | TV | 1 |
| 11 | Mobile station classmark 2 | Mobile station classmark 2 | O | TLV | 5 |
| 20 | Mobile station classmark 3 | Mobile station classmark 3 | O | TLV | 2-34 |
| 40 | Supported Codecs | Supported Codec List | O | TLV | 5-n |
| F- | Additional update type | Additional update type | O | TV | 1 |
| 5D | Voice domain preference and UE's usage setting | Voice domain preference and UE's usage setting | O | TLV | 3 |
| D- | Device properties | Device properties | O | TV | 1 |
| E- | Old GUTI type | GUTI type | O | TV | 1 |
| C- | MS network feature support | MS network feature support | O | TV | 1 |

TABLE 3-continued

| IEI | Information Element | Type/Reference | Presence | Format | Length |
|---|---|---|---|---|---|
| 10 | TMSI based NRI container | Network resource identifier container | O | TLV | 4 |
| A- | Small Data Indication | Small Data Indication | O | TV | 1 |

TABLE 4

| IEI | Information Element | Type/Reference | Presence | Format | Length |
|---|---|---|---|---|---|
|  | Protocol discriminator | Protocol discriminator | M | V | ½ |
|  | Security header type | Security header type | M | V | ½ |
|  | Attach accept message identity | Message type | M | V | 1 |
|  | EPS attach result | EPS attach result | M | V | ½ |
|  | Spare half octet | Spare half octet | M | V | ½ |
|  | T3412 value | GPRS timer | M | V | 1 |
|  | TAI list | Tracking area identity list | M | LV | 7-97 |
|  | ESM message container | ESM message container | M | LV-E | 5-n |
| 50 | GUTI | EPS mobile identity | O | TLV | 13 |
| 13 | Location area identification | Location area identification | O | TV | 6 |
| 23 | MS identity | Mobile identity | O | TLV | 7-10 |
| 53 | EMM cause | EMM cause | O | TV | 2 |
| 17 | T3402 value | GPRS timer | O | TV | 2 |
| 59 | T3423 value | GPRS timer | O | TV | 2 |
| 4A | Equivalent PLMNs | PLMN list | O | TLV | 5-47 |
| 34 | Emergency number list | Emergency number list | O | TLV | 5-50 |
| 64 | EPS network feature support | EPS network feature support | O | TLV | 3 |
| F- | Additional update result | Additional update result | O | TV | 1 |
| 5E | T3412 extended value | GPRS timer 3 | O | TLV | 3 |
| A- | Small Data Indication | Small Data Indication | O | TV | 1 |

TABLE 5

| IEI | Information Element | Type/Reference | Presence | Format | Length |
|---|---|---|---|---|---|
|  | Protocol discriminator | Protocol discriminator | M | V | ½ |
|  | EPS bearer identity | EPS bearer identity | M | V | ½ |
|  | Procedure transaction identity | Procedure transaction identity | M | V | 1 |
|  | PDN connectivity request message identity | Message type | M | V | 1 |
|  | Request type | Request type | M | V | ½ |
|  | PDN type | PDN type | M | V | ½ |
| D- | ESM information transfer flag | ESM information transfer flag | O | TV | 1 |
| 28 | Access point name | Access point name | O | TLV | 3-102 |
| 27 | Protocol configuration options | Protocol configuration options | O | TLV | 3-253 |
| C- | Device properties | Device properties | O | TV | 1 |
| A- | Small Data Indication | Small Data Indication | O | TV | 1 |

TABLE 6

| IEI | Information Element | Type/Reference | Presence | Format | Length |
|---|---|---|---|---|---|
|  | Protocol discriminator | Protocol discriminator | M | V | ½ |
|  | EPS bearer identity | EPS bearer identity | M | V | ½ |
|  | Procedure transaction identity | Procedure transaction identity | M | V | 1 |
|  | Bearer resource allocation request message identity | Message type | M | V | 1 |
|  | Linked EPS bearer identity | Linked EPS bearer identity | M | V | ½ |
|  | Spare half octet | Spare half octet | M | V | ½ |
|  | Traffic flow aggregate | Traffic flow aggregate description (contains set of packet filters) Modified packet data filter for Small Data flow are described above. | M | LV | 2-256 |
|  | Required traffic flow QoS | EPS quality of service | M | LV | 2-14 |

TABLE 6-continued

| IEI | Information Element | Type/Reference | Presence | Format | Length |
|---|---|---|---|---|---|
| 27 | Protocol configuration options | Protocol configuration options | O | TLV | 3-253 |
| C- | Device properties | Device properties | O | TV | 1 |
| A- | Small Data Indication | Small Data Indication | O | TV | 1 |

TABLE 7

| IEI | Information Element | Type/Reference | Presence | Format | Length |
|---|---|---|---|---|---|
|  | Protocol discriminator | Protocol discriminator | M | V | ½ |
|  | EPS bearer identity | EPS bearer identity | M | V | ½ |
|  | Procedure transaction identity | Procedure transaction identity | M | V | 1 |
|  | Bearer resource modification request message identity | Message type | M | V | 1 |
|  | EPS bearer identity for packet filter | Linked EPS bearer identity | M | V | ½ |
|  | Spare half octet | Spare half octet | M | V | ½ |
|  | Traffic flow aggregate | Traffic flow aggregate description(contains set of packet filters) section 5.1.5.2 describes the modified packet data filter for Small Data flow | M | LV | 2-256 |
| 5B | Required traffic flow QoS | EPS quality of service | O | TLV | 3-15 |
| 58 | ESM cause | ESM cause | O | TV | 2 |
| 27 | Protocol configuration options | Protocol configuration options | O | TLV | 3-253 |
| C- | Device properties | Device properties | O | TV | 1 |
| A- | Small Data Indication | Small Data Indication | O | TV | 1 |

TABLE 8

| IEI | Information Element | Type/Reference | Presence | Format | Length |
|---|---|---|---|---|---|
|  | Protocol discriminator | Protocol discriminator | M | V | ½ |
|  | EPS bearer identity | EPS bearer identity | M | V | ½ |
|  | Procedure transaction identity | Procedure transaction identity | M | V | 1 |
|  | Activate default EPS bearer context request message identity | Message type | M | V | 1 |
|  | EPS QoS | EPS quality of service | M | LV | 2-14 |
|  | Access point name | Access point name | M | LV | 2-101 |
|  | PDN address | PDN address | M | LV | 6-14 |
| 5D | Transaction identifier | Transaction identifier | O | TLV | 3-4 |
| 30 | Negotiated QoS | Quality of service | O | TLV | 14-22 |
| 32 | Negotiated LLC SAPI | LLC service access point identifier | O | TV | 2 |
| 8- | Radio priority | Radio priority | O | TV | 1 |
| 34 | Packet flow Identifier | Packet flow Identifier | O | TLV | 3 |
| 5E | APN-AMBR | APN aggregate maximum bit rate | O | TLV | 4-8 |
| 58 | ESM cause | ESM cause | O | TV | 2 |
| 27 | Protocol configuration options | Protocol configuration options 9.9.4.11 | O | TLV | 3-253 |
| B- | Connectivity type | Connectivity type | O | TV | 1 |
| A- | Small Data Indication | Small Data Indication | O | TV | 1 |

TABLE 9

| IEI | Information Element | Type/Reference | Presence | Format | Length |
|---|---|---|---|---|---|
|  | Protocol discriminator | Protocol discriminator | M | V | ½ |
|  | EPS bearer identity | EPS bearer identity | M | V | ½ |
|  | Procedure transaction identity | Procedure transaction identity | M | V | 1 |
|  | Activate dedicated EPS bearer context request message identity | Message type | M | V | 1 |
|  | Linked EPS bearer identity | Linked EPS bearer identity | M | V | ½ |
|  | Spare half octet | Spare half octet | M | V | ½ |

TABLE 9-continued

| IEI | Information Element | Type/Reference | Presence | Format | Length |
|---|---|---|---|---|---|
|  | EPS QoS | EPS quality of service | M | LV | 2-14 |
|  | TFT | Traffic flow template-modified TFT is described above. | M | LV | 2-256 |
| 5D | Transaction identifier | Transaction identifier | O | TLV | 3-4 |
| 30 | Negotiated QoS | Quality of service | O | TLV | 14-22 |
| 32 | Negotiated LLC SAPI | LLC service access point identifier | O | TV | 2 |
| 8- | Radio priority | Radio priority | O | TV | 1 |
| 34 | Packet flow Identifier | Packet flow Identifier | O | TLV | 3 |
| 27 | Protocol configuration options | Protocol configuration options | O | TLV | 3-253 |
| A- | Small Data Indication | Small Data Indication | O | TV | 1 |

TABLE 10

| IEI | Information Element | Type/Reference | Presence | Format | Length |
|---|---|---|---|---|---|
|  | Protocol discriminator | Protocol discriminator | M | V | ½ |
|  | EPS bearer identity | EPS bearer identity | M | V | ½ |
|  | Procedure transaction identity | Procedure transaction identity | M | V | 1 |
|  | Modify EPS bearer context request message identity | Message type | M | V | 1 |
| 5B | New EPS QoS | EPS quality of service | O | TLV | 3-15 |
| 36 | TFT | Traffic flow template-section 5.1.5.2 describes modified TFT. | O | TLV | 3-257 |
| 30 | New QoS | Quality of service | O | TLV | 14-22 |
| 32 | Negotiated LLC SAPI | LLC service access point identifier | O | TV | 2 |
| 8- | Radio priority | Radio priority | O | TV | 1 |
| 34 | Packet flow Identifier | Packet flow Identifier | O | TLV | 3 |
| 5E | APN-AMBR | APN aggregate maximum bit rate | O | TLV | 4-8 |
| 27 | Protocol configuration options | Protocol configuration options | O | TLV | 3-253 |
| A- | Small Data Indication | Small Data Indication | O | TV | 1 |

TABLE 11

Small Data Indication value (SDIV) (octet 1)

| Bit | | |
|---|---|---|
| 1 | | |
| 0 | Normal mode. Small Data procedures should not be used. | |
| 1 | Small Data Mode | |

Bits 4 to 2 of octet 1 are spare and shall be all coded as zero.

TABLE 12

Packet Filter Type (PFT) (bit 8 and 7)

| Bit | |
|---|---|
| 8 7 | |
| 0 0 | Regular Packet Filter |
| 0 1 | Small Data packet Filter Only (not to be used for regular packet matching) |
| 1 0 | Both (can be used for regular packet matching as well as SD matching) |
| 1 1 | Reserved |

TABLE 13

| AAA | AA-Answer |
|---|---|
| AAR | AA-Request |
| AF | Application Function |
| APN | Access Point Name |
| AS | Application Server |
| ASP | Application Service Provider |
| AVP | Attribute Value Pair |
| BBERF | Bearer Binding and Event Reporting Function |
| CN | Core Network |

TABLE 13-continued

| DRB | Data Radio Bearer |
|---|---|
| EMM | EPS Mobility Management |
| eNB | Evolved Node B |
| EPS | Evolved Packet System |
| ESM | EPS Session Management |
| GPRS | General Packet Radio Service |
| GTP | GPRS Tunneling Protocol |
| GTP-C | GTP Control |
| GTP-U | GTP User |
| HSS | Home Subscriber Server |
| MME | Mobility Management Entity |
| MO | Management Object |
| MT | Mobile Termination |
| MTC | Machine Type Communications |
| MTC-IWF | Machine Type Communications - Inter-Working Function |
| NAS | Non-Access-Stratum |
| PCC | Policy and Charging Control |
| PCEF | Policy and Charging Enforcement Function |
| PCRF | Policy and Charging Rules Function |
| PDN | Packet Data Network |
| P-GW | PDN Gateway |
| RAA | Re-Auth-Answer (RA-Answer) |
| RAR | Re-Auth-Request (RA-Request) |
| SCEF | Service Capability Exposure Function |
| SCS | Services Capability Server |
| SD | Small Data |
| SDDTE | Small Data and Device Triggering Enhancements |
| S-GW | Serving Gateway |
| SPR | Subscription Profile Repository |
| SRB | Signaling Radio Bearer |
| TA | Terminal Adaption |
| TAU | Tracking Area Update |
| TDF | Traffic Detection Function |
| TE | Terminal Equipment |
| TFT | Traffic Flow Template |
| UDR | User Data Repository |

TABLE 13-continued

| | |
|---|---|
| UE | User Equipment |
| UICC | Universal Integrated Circuit Card |

What is claimed:

1. An apparatus comprising a processor, a memory, and communication circuitry, the apparatus being connected to a communication network via the communication circuitry, the apparatus further comprising computer-executable instructions stored in the memory which, when executed by the processor, cause the apparatus to:
transmit, to a network system via the communication network, a first message, the first message being an attach request message, the first message comprising an indication that the apparatus supports one or more small data procedures;
receive, from the network system, a second message, the second message being an attach response comprising a first indication that the apparatus may use one or more of the small data procedures, the second message further comprising a second indication that traffic that is associated with a first Packet Data Network (PDN) connection of the apparatus may only use small data mode;
determine, based on the first and second indications, that the first PDN connection should be used to send uplink data; and
send, via the first PDN connection, the uplink data.

2. The apparatus of claim 1, wherein the instructions further cause the apparatus to transmit data in accordance with a small data procedure indicated in the response.

3. The apparatus of claim 2, wherein the instructions further cause the apparatus to send a packet data network (PDN) connectivity request to the network system, the PDN connectivity request comprising a request that a PDN connection be used for small data.

4. The apparatus of claim 2, wherein the one or more small data procedures are indicated via non-access-stratum (NAS) messaging.

5. The apparatus of claim 2, wherein the instructions further cause the apparatus to determine to use, for a data transfer, a small data procedure in lieu of a service request procedure.

6. The apparatus of claim 2, wherein:
the network system comprises a mobility management entity (MME) and a home subscriber server (HSS), the MME being configured to receive a third message from the HSS and to send the second message;
the third message indicates one or more packet data network (PDN) connections that should use small data procedures, whereby the apparatus is configured to receive the second message from the MME; and
the second message further comprises an indication of the one or more PDN connection, an indication of a type of small data procedure that corresponds to each of the one or more PDN connections, and information pertaining to applying restrictions for small data services.

7. The apparatus of claim 2, wherein the apparatus is a user equipment (UE).

8. A method performed by a network apparatus, the method comprising:
receiving, from an endpoint apparatus, a first message, the first message being an attach request comprising an indication that the endpoint apparatus supports one or more small data procedures, the first message further comprising a request that the endpoint apparatus use a small data procedure;
receiving a second message, the second message indicating one or more packet data network (PDN) connections that should use small data procedures, the second message further indicating a type of small data procedure corresponding to each of the one or more PDN connections, the second message further comprising information pertaining to applying restrictions for small data services; and
sending, based on the second message, a third message, the third message being an attach response comprising first indication that the endpoint apparatus may use one or more of the supported small data procedures, the third message further comprising a second indication that traffic that is associated with a first Packet Data Network (PDN) connection of the endpoint apparatus may only use small data mode.

9. The method of claim 8, further comprising receiving, from the endpoint apparatus, data in accordance with a small data procedure indicated in the second message.

10. The method of claim 9, wherein the requested small data procedure indicated is indicated via non-access-stratum (NAS) messaging.

11. The method of claim 8, wherein:
the method is performed by a mobility management entity (MME);
the endpoint apparatus is a user equipment (UE); and
the second message is sent by a home subscriber server (HSS).

12. The method of claim 8, wherein the second message comprises an insert subscriber data message or an update location request message.

13. The method of claim 8, wherein the endpoint apparatus is a user equipment (UE).

14. An apparatus comprising a processor, a memory, and communication circuitry, the apparatus being connected to a communication network via the communication circuitry, the apparatus further comprising computer-executable instructions stored in the memory which, when executed by the processor, cause the apparatus to:
transmit, to a network system via the communication network, a first message, the first message being an attach request message, the first message comprising an indication that the apparatus supports one or more small data procedures;
receive, from the network system, a second message, the second message being an attach response, the second message comprising a first indication that the apparatus may use one or more of the small data procedures, the second message further comprising a second indication that traffic that is associated with a first Packet Data Network (PDN) connection of the apparatus may use only small data procedures while the apparatus remains attached to the network system;
determine, based on the first and second indications, that the first PDN connection should be used to send uplink data; and
send, via the first PDN connection, the uplink data.

15. The apparatus of claim 14, wherein the instructions further cause the apparatus to transmit data in accordance with a small data procedure indicated in the response.

16. The apparatus of claim 15, wherein the instructions further cause the apparatus to send a packet data network (PDN) connectivity request to the network system, the PDN connectivity request comprising a request that a PDN connection be used for small data.

17. The apparatus of claim 15, wherein the one or more small data procedures are indicated via non-access-stratum (NAS) messaging.

18. The apparatus of claim 15, wherein the instructions further cause the apparatus to determine to use, for a data transfer, a small data procedure in lieu of a service request procedure.

19. The apparatus of claim 15, wherein:
   the network system comprises a mobility management entity (MME) and a home subscriber server (HSS), the MME being configured to receive a third message from the HSS and to send the second message;
   the third message indicates one or more packet data network (PDN) connections that should use small data procedures;
   the apparatus is configured to receive the second message from the MME; and
   the second message further comprises an indication of the one or more PDN connections and a type of small data procedure that corresponds to each of the one or more PDN connections.

20. The method of claim 8, wherein the third message further comprises an indication that the apparatus should use only small data procedures while the apparatus remains attached to the network system.

\* \* \* \* \*